United States Patent [19]
Rudy

[11] Patent Number: 5,042,176
[45] Date of Patent: Aug. 27, 1991

[54] LOAD CARRYING CUSHIONING DEVICE WITH IMPROVED BARRIER MATERIAL FOR CONTROL OF DIFFUSION PUMPING

[75] Inventor: Marion F. Rudy, Northridge, Calif.

[73] Assignee: Robert C. Bogert, Marina Del Rey, Calif.

[21] Appl. No.: 452,070

[22] Filed: Dec. 28, 1989

Related U.S. Application Data

[63] Continuation-in-part of Ser. No. 298,899, Jan. 19, 1989, Pat. No. 4,936,029.

[51] Int. Cl.⁵ .................... A43B 13/18; A61F 05/14
[52] U.S. Cl. .......................................... 36/29; 36/71; 128/594
[58] Field of Search .................... 36/29, 43, 71, 44; 128/594, 383; 428/35.4, 12, 69, 72, 158, 166, 178; 5/441, 442, 449, 450, 455; 2/413; 267/64.11

[56] References Cited

U.S. PATENT DOCUMENTS

| | | | |
|---|---|---|---|
| 4,183,156 | 1/1980 | Rudy | 36/44 |
| 4,340,626 | 7/1982 | Rudy | 36/29 |
| 4,817,304 | 4/1989 | Parker et al. | 36/29 |
| 4,936,029 | 6/1990 | Rudy | 36/29 |

Primary Examiner—Steven N. Meyers
Attorney, Agent, or Firm—Beehler & Pavitt

[57] ABSTRACT

A product in the form of a cushioning device made from thermoplastic film containing crystalline material inflated to a relatively high pressure and sealed at the time of manufacture. The product maintains the internal inflatant pressure for long periods of time by employing a form of the diffusion pumping phenomenom of self-inflation in which the mobile gas is the gas components of air other than nitrogen. Improved and novel cushioning devices use new material, for the film of the enclosure nevelope which can selectively control the rate of diffusion pumping, thereby permitting a wider latitude flexibility and greater accuracy in the design of such new cushioning device, thus improving the performance and reducing cost of such devices while elminating some of the disadvantages of the earlier products. It is possible to permanently inflate certain types of new devices using readily available gases such as nitrogen, or air in which case nitrogen forms the captive gas.

55 Claims, 19 Drawing Sheets

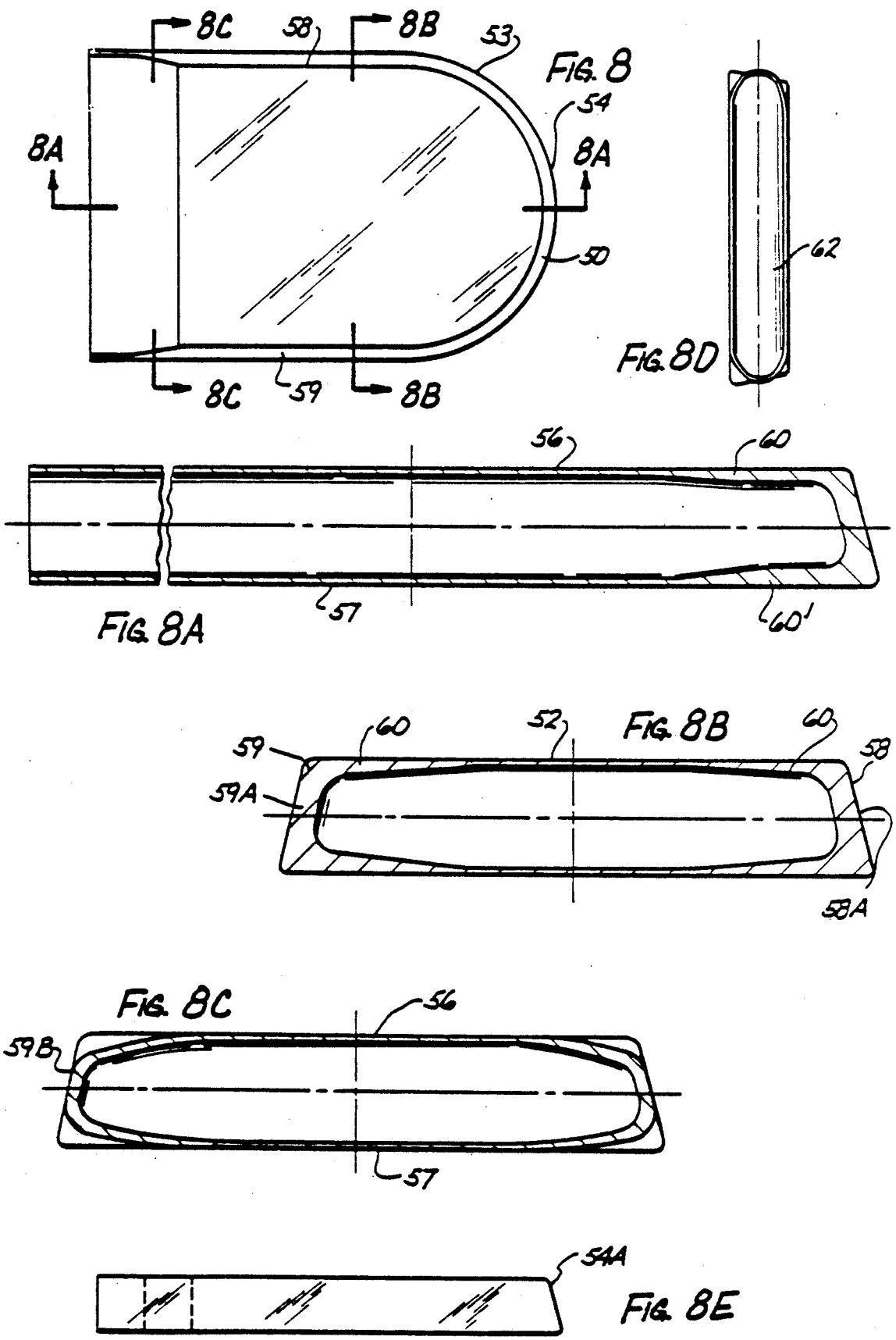

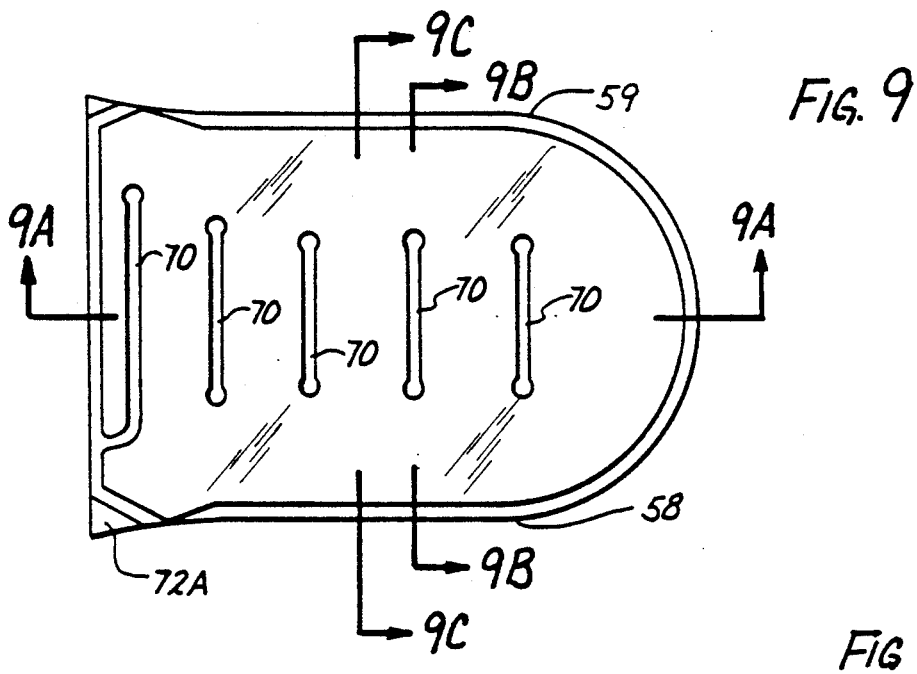
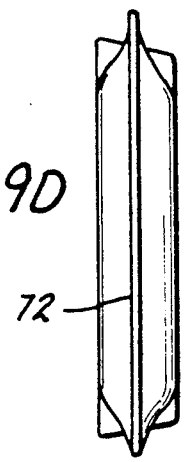
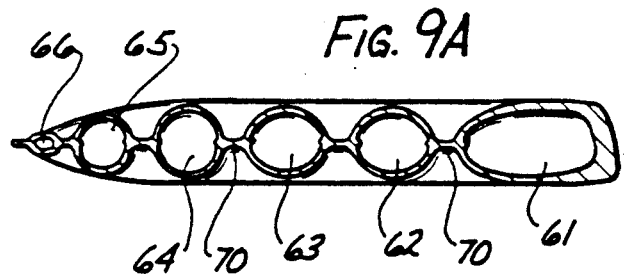
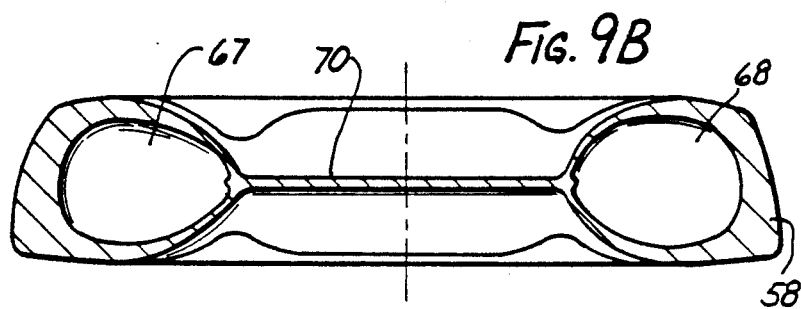
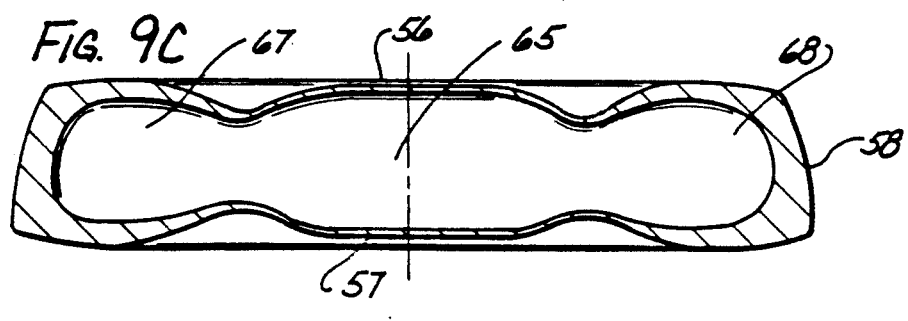

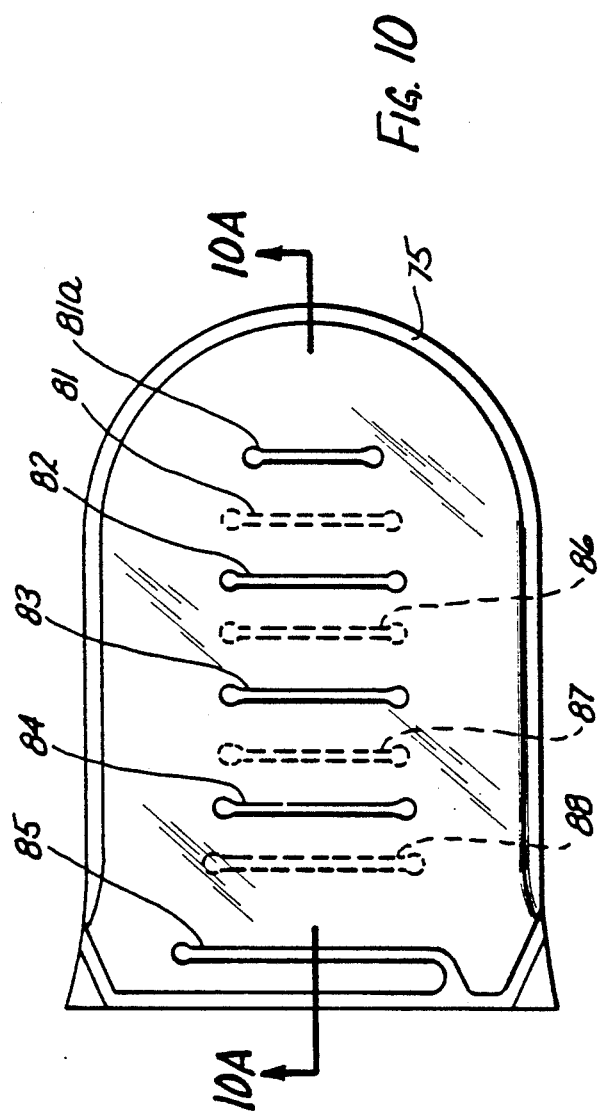

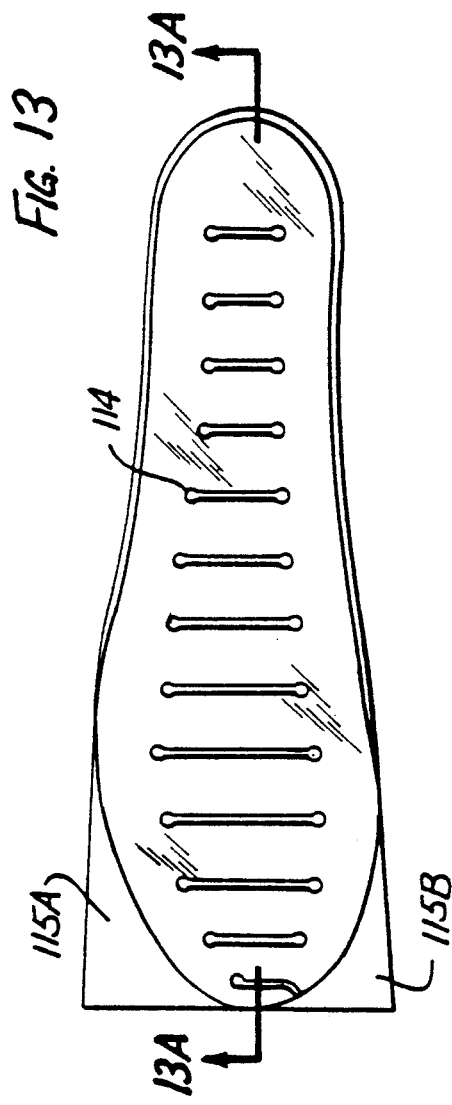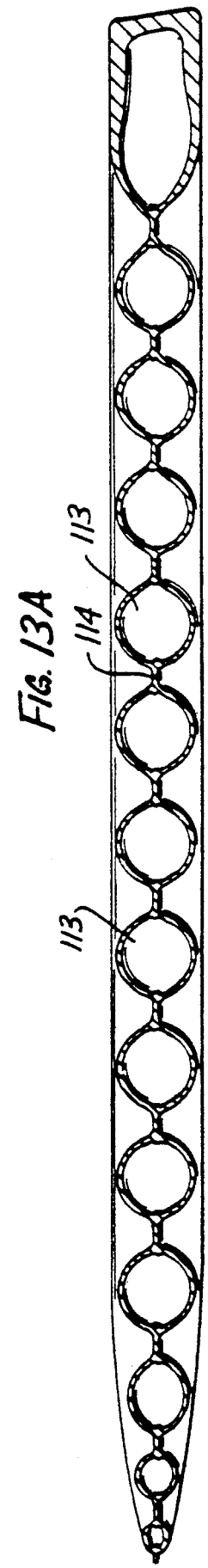

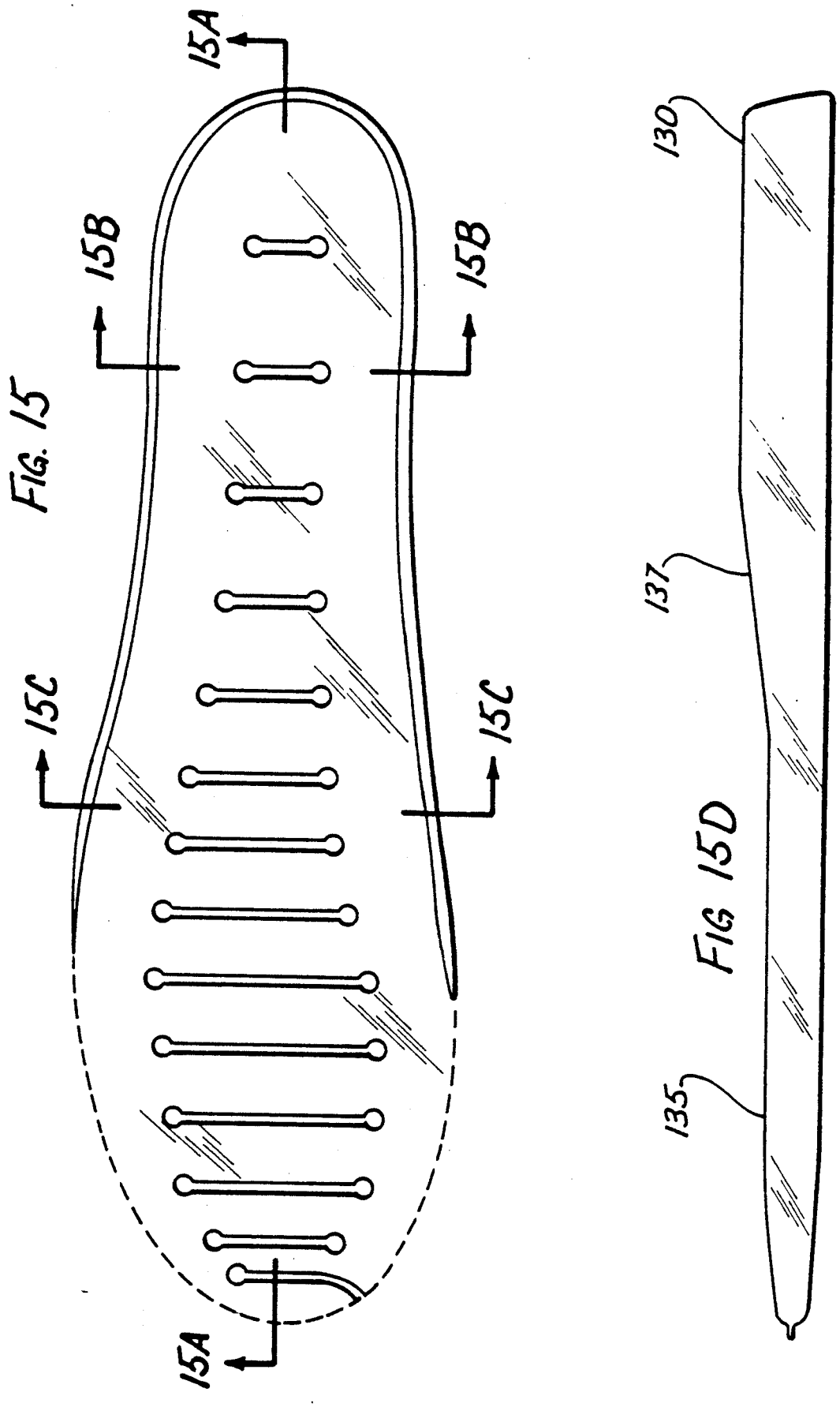

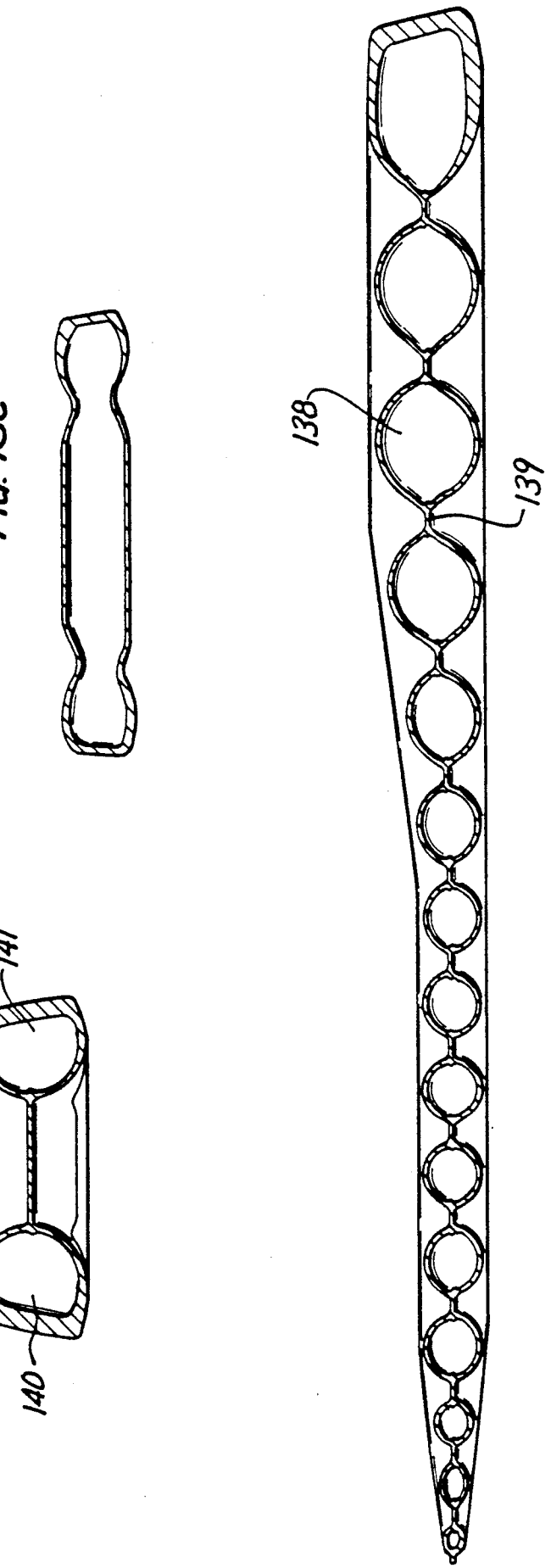
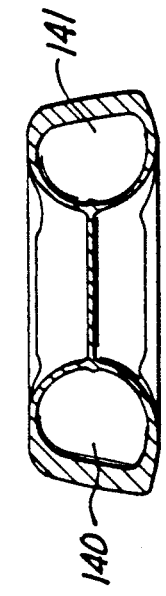

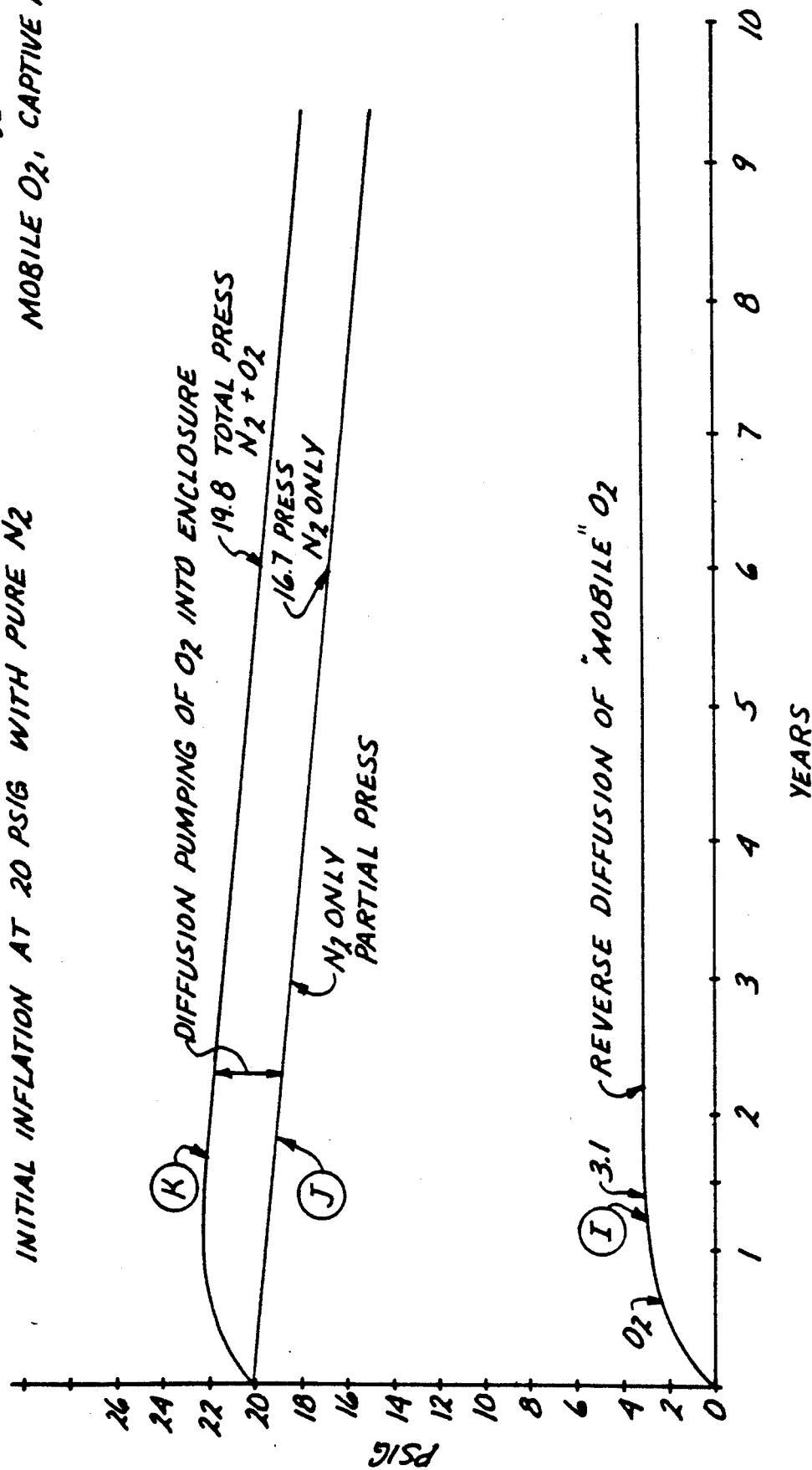

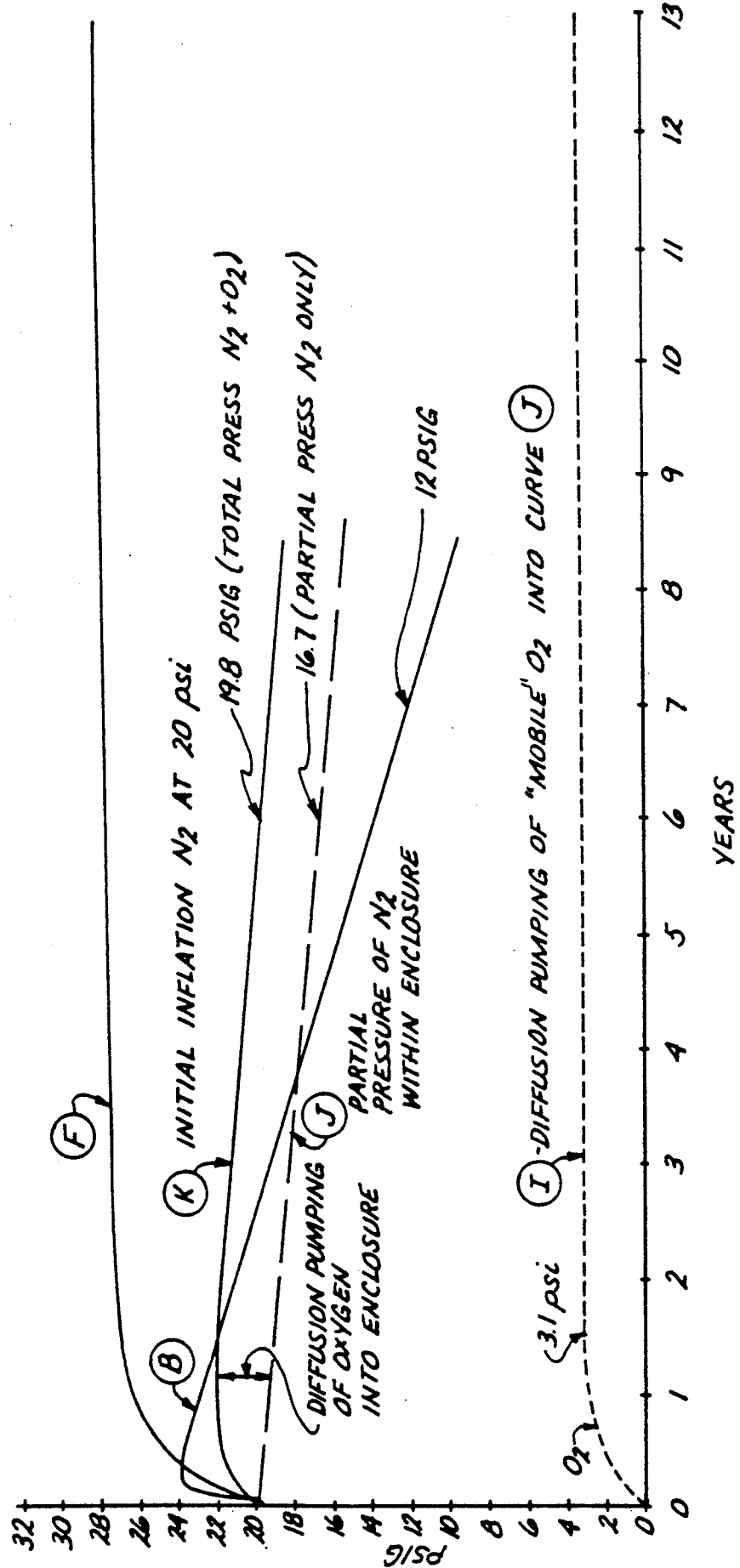

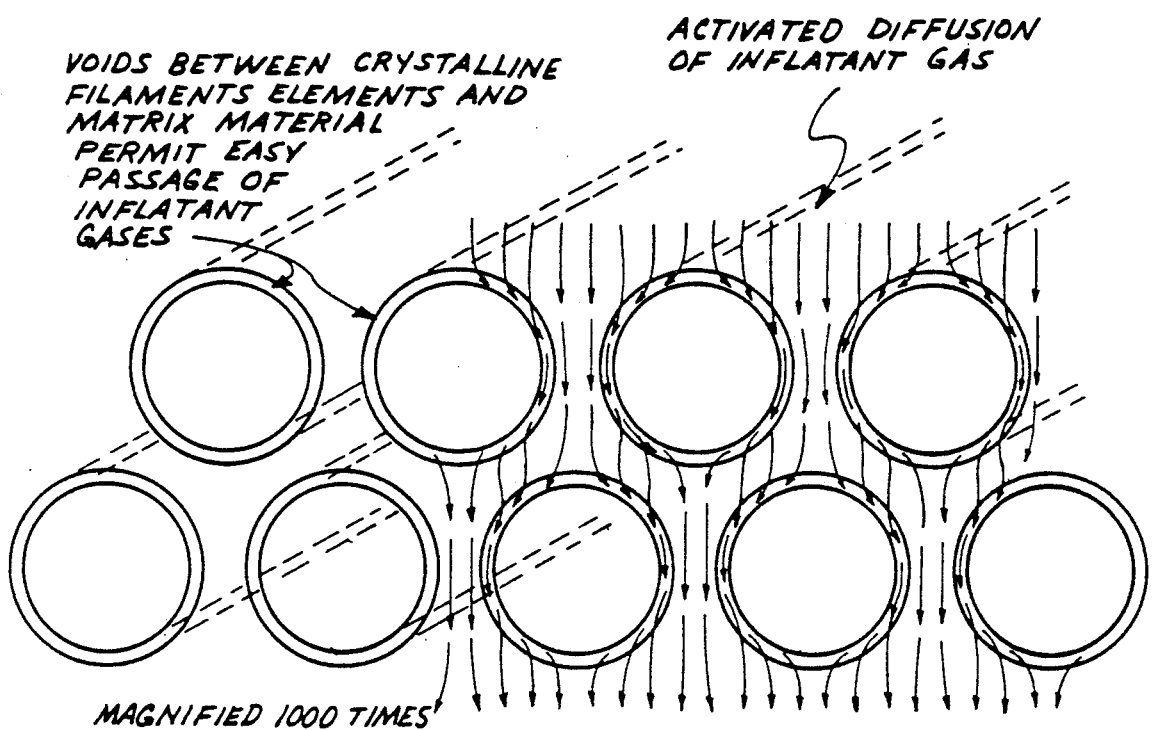
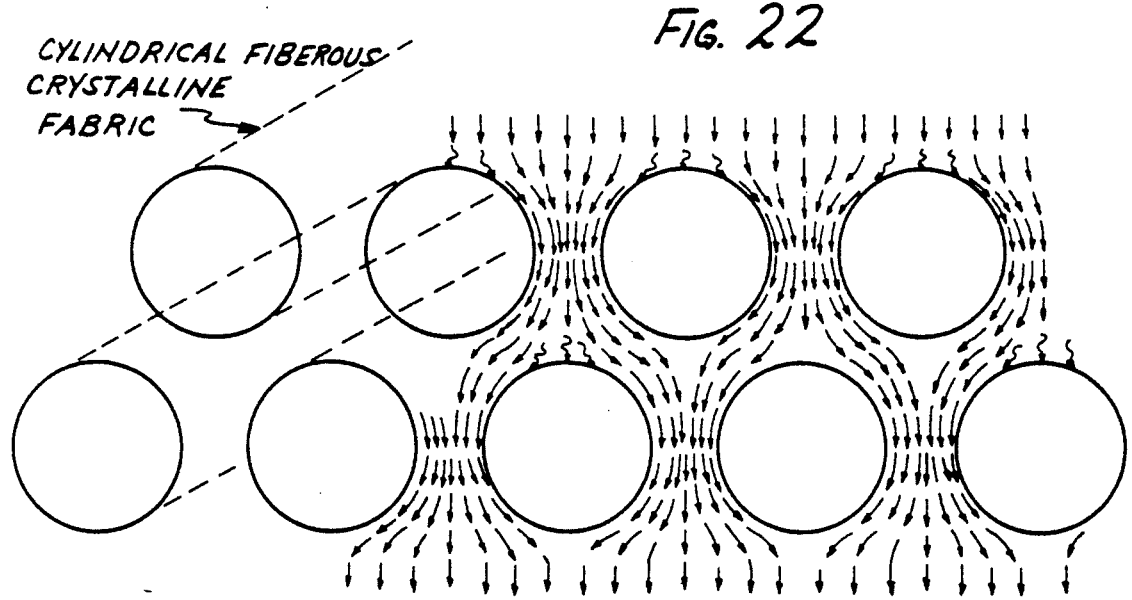

LOAD CARRYING CUSHIONING DEVICE WITH IMPROVED BARRIER MATERIAL FOR CONTROL OF DIFFUSION PUMPING

This application is a continuation in part of application Ser. No. 07/298,899 filed on Jan. 19, 1989 now U.S. Pat. No. 4,936,029.

FIELD OF INVENTION

The present invention relates to load bearing cushioning devices and more particularly to an improved inflated cushioning device which utilizes an improved barrier material which selectively controls diffusion of nitrogen and which precludes the diffusion of supergases while permitting controlled diffusion of other gases contained in air.

Related Applications

This application is related to U.S. application Ser. No. 07/147,131, filed on Feb. 5, 1988 for "Pressurizable Envelope and Method", whose disclosure is incorporated herein as though fully set forth.

BACKGROUND OF THE INVENTION

This application is an improvement of my earlier U.S. patents, including U.S. Pat. No. 4,183,156, entitled "Insole Construction for Articles of Footwear", issued Jan. 15, 1983, and U.S. Pat. No. 4,287,250, entitled "Elastomeric Cushioning Devices for Products and Objects," issued on Sept. 1, 1981, and U.S. Pat. No. 4,340,626, entitled "Diffusion Pumping Apparatus Self-Inflating Device," issued July 20, 1982.

U.S. Pat. No. '156 describes a cushioning device for articles of footwear comprising a elastomeric film envelope enclosure, preferably heat-sealed, and which is permanently inflated and pressurized during manufacture. U.S. Pat. No. '250 is more general and applies to other types of cushioning products, i.e., shock absorbers, packaging liners, helmets, door and window seals, athletic mats, mattresses, personal protective padding, etc. These earlier products utilize thermoplastic elastomeric films with the described physical properties and are inflated with novel inflatant gases, i.e. "supergases" as therein described, to achieve long-term pressurization at relatively high pressures. The method of achieving this essentially permanent inflation for the useful life of the products makes use of the novel process of diffusion pumping as described in detail in my prior U.S. Pat. No. '626.

Some form of permanent inflation and the technique therefor are important with respect to commercial acceptance of inflated product or air cushion elements to be used in footwear. For example:

(1) All valving systems leak to some degree even when new and to a much greater degree when dirty. Due to the small volume of the inflated part, even minute leaks cause an unacceptable loss in pressure and a concurrent loss of cushioning, resiliency and support.

(2) Proper cushioning requires that the air cushion or inflated product maintain a fairly precisely controlled level of pressurization, i.e., within a few pounds of the desired pressure.

(3) The user is generally impatient and will not take the necessary time or trouble to maintain the proper inflation pressure within the device.

(4) The cost of the air cushion or the product with system tends to be expensive. Not only is there the cost of the valve, but the user must be provided with a pump and a pressure gage, both of which may be costly.

(5) The air cushion or inflated device may be easily over pressurized and damaged or destroyed by the user.

(6) Improper pressurization or under pressurization may result in injury to the user.

(7) The pump and pressure gage may not be available to the user when needed.

(8) In cushion devices having small volumes, such as cushioning elements for footwear, the volume is so small and the pressure is so high that the process of taking a pressure reading with a typical Bourden tube pressure gage will drop the pressure between 2 and 5 pounds. Thus, the user must learn to over inflate by 2 to 5 pounds before taking a reading. This can be a tricky procedure, especially for younger children.

(9) Efforts to make a gas barrier envelope comprised of a multi-layered film sandwich comprising some sort of barrier layer within the sandwich invariably fail because of delamination adjacent to the weldments or in a region of high flexural stress.

With these devices, it is important to use diffusion pumping because to make a practical long-term pressurized cushion, it was necessary to utilize a thermoplastic elastomeric envelope film possessing certain specified physical characteristics, i.e., good processability, good heat-sealing properties, superior fatigue resistance under repeated application of comparatively high cyclical loads, as well as appropriate properties of tensile strength, puncture resistance, tear-strength, and elasticity. Because these practical considerations took precedence over the barrier properties (resistance to outward diffusion of inflation gases) of the film, it was necessary to inflate with supergas(es) and use diffusion pumping by air to help maintain the internal pressure within design limits. Good barrier materials would have been desirable for maintaining inflatant pressure, but they are necessarily crystalline in structure and thus have very poor and unacceptable physical properties, especially as regards heat-sealability, fatigue resistance and elasticity. Therefore, they could not be used for these applications. In other words, one of the considerations in the selection of barrier film materials was the fact that relatively large molecular diameter inflatant gases such as the supergases mentioned were used as the inflatant and the film materials were those which would retain the supergases but permit diffusion of smaller molecular diameter gases such as those present in air whose composition is nitrogen (78%), oxygen (20.9%), carbon dioxide (0.033%), argon (0.934%) and the other gases (neon, helium, krypton, xenon, hydrogen, methane and nitrous oxide) which collectively make up about 30 parts per million of environmental air.

Diffusion pumping is described in my earlier U.S. Pat. No. '626 as follows. A pair of elastomeric, selectively permeable sheets are sealed together at desired intervals along weld lines to form one or more chambers which are later inflated with a gas, or a mixture of gases, to a prescribed pressure above atmospheric. The gas or gases selected have very low diffusion rates through the permeable sheets to the exterior of the chamber(s), the nitrogen, oxygen, and argon of the surrounding air having relatively high diffusion rates through the sheets into the chambers, producing an increase in the total pressure (potential energy level) in the chambers, resulting from diffusion pumping, which is the addition of the partial pressures of the nitrogen, oxygen, and argon of the air to the partial pressure of the gas or gases in the chambers.

Since diffusion pumping with supergas as the inflatant relies on the diffusion of the gas components of air into the envelope, there is a period of time involved before a steady state internal pressure is achieved. For example, oxygen gas diffuses into the envelope rather quickly, usually in a matter of weeks. The effect is to increase the internal pressure by about 2.5 psi. Over the next months, nitrogen gas will diffuse into the envelope and the effect is gradually to increase the pressure by an increment of about 12 psi.

There is a second effect which takes place due to the elastomeric nature of the film and that is tensile relaxation or what is sometimes called creep. The gradual increase in pressure causes about a 20% increase in the volume of the envelope over its original configuration before a steady state configuration is achieved. The net effect is that over a period of time, the internal pressure increases by about 14 psi and the volume of the envelope geometry changes by expanding. As a practical matter, these changes in geometry have been compensated for by controlled manufacturing techniques to provide an effective product. Nonetheless, the change in geometry has handicapped the design of inflated products whose geometry must be closely controlled.

Having in mind that the object was to provide an inflated product which provided a cushion feel, in addition to the other advantages mentioned in the earlier identified patents, over inflation tended to produce a hard product rather than a cushion. Under inflation to compensate for later increase in internal pressure resulted in product which would "bottom out" rather than act as a cushion. The increase in pressure over a period of months was a consideration which resulted in initially filling the envelope with a mixture of supergas and air in order to provide a product which was not over inflated, thus initially providing the desired cushion feel. This did not, however, eliminate the volume growth due to tensile relaxation. The need to mix predetermined quantities of supergas and air in order to provide the cushion feel tended to complicate the manufacturing process.

The accomplished objectives of my prior diffusion pumping technology was to develop and perfect an exceptionally durable, reliable, fatigue resistant and long life means of extracting the partial pressure energy of the inflatant gases comprising the ambient air, and to use or convert this potential energy to perform useful work in various products.

While diffusion pumping using supergases and elastomeric non-crystallographic film material has operated satisfactorily, an improved product is desirable. For example, many millions of pairs of footwear have been sold in the United States and throughout the world over the past ten years under the trademark "AIR SOLE" and other trademarks by Nike Shoe Company. These products of Nike Shoe Company are made in accordance with one or more of the previously identified patents and are generally regarded as premium quality footwear having the benefits of a gas filled, long service life component which offers practical advantages over competitive footwear products. The failure rate from all causes, including accidental puncture, is believed to be less than 0.001 percent. Even so, there is room for improvement in the currently commercial versions of the inventions of the above patents, as will be discussed.

It is also known in the art to use certain types of plastics which are essentially impermeable to diffusion of oxygen or carbon dioxide. Typically these plastics are polycarbonate materials used in the plastic bottles of the beverage industry or SARAN or PVDC or polyethyleneterephthalate (PET). The difficulty with polycarbonate and similar totally impermeable plastics is the relatively low fatigue resistance and the difficulty in forming R-F welds. For example, when an inflated and pressurized product of these materials is subjected to severe flexural fatigue, the part would fail after a few minutes or hours of use. In order to seal such materials, it is generally necessary to heat the facing plastics to the melting point to bring about some flow. The result is that it is difficult, if not impossible with these materials, to hold a predetermined geometry and to obtain tight and good welds by heat fusion. These materials are not polar in nature and they generally cannot be R-F welded successfully.

If highly fatigue resistant and readily weldable and heat sealable and vulcanizable elastomeric materials are used, and the pressurizing gas is air or other gases such as nitrogen or carbon dioxide or argon or xenon or conventional Freon refrigerant gases, the latter would diffuse rapidly through these materials. This problem was solved by the prior diffusion pumping technique and the use of "supergas(es)" with elastomeric barrier materials with the benefits of reverse diffusion of oxygen and nitrogen gas from ambient air into the part. Over a period of time, there was almost perfect compensation for the volume growth of the part that resulted from the tensile relaxation properties of the elastomeric barrier material. However, if the part was to be pressurized to a relatively low inflation pressure, as is the case with "fashion footwear" as contrasted to "service footwear" the diffusion pumping of ambient air resulted in an unacceptably large pressure variation (increase) during the beginning life of the product. This and other problems are solved by the present invention.

Therefore, it is an object of this invention to provide an inflated cushioning device having longer service life at the designed internal pressure and which can be accurately controlled both in terms of steady state internal pressure and geometry.

It is a further object of this invention to match more closely the tensile relaxation properties of the enclosure film with the outward flow of gases, thereby helping to maintain more constant inflatant pressure over the service life of the product.

Another object is to slow down the inward flow of ambient air during early stages (6 to 24 months) of diffusion pumping, thereby reducing the tendency of over pressurizing certain types of the devices or bringing about gradual and undesired changes in geometry.

A further object of the invention is to use more readily available, lower weight, less expensive gases that function as the captive gas.

A further object is to permit use of selected envelope films which are superior and/or less costly for some applications.

Still another object is to provide a practical inflated cushioning device which can be pressurized with air or nitrogen, or combination thereof, and maintain inflated characteristics over its service life while exposed to the duty cycle experienced by such cushioning products.

BRIEF DESCRIPTION OF THE INVENTION

Therefore, this present invention relates to load carrying cushioning devices (pneumatic enclosures) with novel envelope film having the needed physical properties of thermoplastic elastomeric film with the added feature of improved barrier properties with respect to nitrogen gas and the supergases. These films are formulated so as to selectively control the rate of outward diffusion of certain captive gases such as nitrogen and the supergases through the envelope as well as the diffusion pumping of other gases, i.e., mobile gases such as oxygen, carbon dioxide and the other gases mentioned and which are present in ambient air, inwardly into the pressurized devices.

Typically, the barrier materials usable in accordance with this invention are preferably thermoplastic, elastomeric and polar in nature and processable to form products of the various geometries to be discussed. The barrier materials of the present invention should contain the captive gas within the envelope for a relatively long period of useful life, e.g. two years or more. For example over a period of two years, the envelope should not lose more than about 20% of the initial inflated gas pressure. Effectively this means that products inflated initially to a steady state pressure of 20 to 22 psig should retain pressure in the range of about 16 to 18 psig.

Additionally, the barrier material should be flexible, relatively soft and compliant and should be fatigue resistant and be capable of being welded to form effective seals by essentially a molecular cross-linking, typically achieved by radio frequency (R-F) welding. Especially important is the ability of the barrier film material to withstand high cyclical loading without failure, especially in the range of film thickness of between about 5 mils to about 50 mils. Film materials which are crystallographic in nature tend not to possess fatigue resistance, although the barrier qualities are generally quite good. Another important quality of the barrier film material is that it must be processable into various shapes by techniques used in high volume production. Among these techniques known in the art are blow molding, injection molding, slush casting, vacuum molding, rotary molding, transfer molding and pressure forming to mention only a few. These processes result in a product whose walls have essentially film properties and whose cross-sectional dimensions can be varied in various portions of the product but which are overall essentially film like in character.

In addition to the above qualities which are important in the effective use of the barrier material which forms an envelope, there is the all important quality of controlled diffusion of mobile gases through the film and retention of captive gases within the envelope. By the present invention, not only are the supergases usable as captive gases, but nitrogen gas is also a captive gas due to the improved nature of the barrier. The primary mobile gas is oxygen, which diffuses relatively quickly through the barrier, and the other gases present in air except nitrogen. The practical effect of providing a barrier material for which nitrogen gas is a captive gas is significant.

For example, the envelope may be initially inflated with nitrogen gas or a mixture of nitrogen gas and one or more supergases or with air. If filled with nitrogen or a mixture of nitrogen and one or more supergases, the increment of pressure increase is that due to the relatively rapid diffusion of principally oxygen gas into the envelope since the captive gas is essentially retained in the envelope. This effectively amounts to an increase in pressure of not greater than about 2.5 psi over the initial inflation pressure and results in a relatively modest volume growth of the envelope of between 1 to 5%, depending on the initial pressure.

If air is used as the inflatant gas, oxygen tends to diffuse out of the envelope while the nitrogen is retained as the captive gas. In this instance, the diffusion of oxygen out of the envelope and the retention of the captive gas results in a decrease of the steady state pressure over the initial inflation pressure. For example, if inflated initially with air to a pressure of 26 psig, the pressure drop will be about 4 psig in order to balance the partial pressure of oxygen gas on each side of the barrier envelope wall. The drop in pressure also tends to achieve an early steady state condition with respect to tensile relaxation or creep in that creep is reduced or eliminated because there is no further increase in internal pressure.

It is thus important in the practice of the present invention to provide a barrier material which has effectively the same desirable qualities as previously described, but which has the added quality of being a barrier to nitrogen gas. As already noted, plastic materials or laminated or co-extruded combinations of plastic materials which also operate as barriers to oxygen tend to be essentially crystalline in nature and tend to lack the fatigue resistance needed for products contemplated by this invention and which are subject to relatively high cyclic loads for comparatively long periods of time.

Barrier materials having the desired barrier properties and the other needed qualities in accordance with this invention are those which are basically elastomeric and polar in nature and which have the properties of being comparatively flexible and have high fatigue resistance while also having sufficient crystalline qualities to prevent diffusion of nitrogen gas and the supergases through the envelope. These crystalline qualities may be imparted any one of several ways, including a mechanical crystalline barrier or a molecular crystalline barrier to inhibit the diffusion of the captive gases and several such film and other types of materials will be described in detail.

It is thus apparent that the present invention has several advantages over the prior art and prior patents referred to previously.

It is thus apparent that the present invention has several advantages over the prior art and prior patents referred to previously.

This invention has many other advantages, and other objectives, which may be more clearly apparent from consideration of the various forms in which it may be embodied. Such forms are shown in the drawings accompanying and form a part of the present specification. These forms will now be described in detail for the purpose of illustrating the general principles of the invention; but is understood that such detailed description is not to be taken in the limiting sense.

BRIEF DESCRIPTION OF THE DRAWINGS

FIG. 8 is a plan view of a vacuum formed or blow molded or slush cast heel ped in accordance with the present invention illustrating the product as it is removed from the mold;

FIG. 8A is a sectional view taken along the line 8A—8A of FIG. 8;

FIG. 8B is a sectional view taken along the line 8B—8B of FIG. 8;

FIG. 8C is a sectional view taken along the line 8C—8C of FIG. 8:

FIG. 8D is a view from the end as seen along the line 8D—8D of FIG. 8:

FIG. 8E is a side view as seen along the line 8E—8E of FIG. 8;

FIG. 9 is a plan view of the completed heel ped of FIG. 8 after heat sealing and trimming have been completed;

FIG. 9A is a sectional view taken along the line 9A—9A of FIG. 9;

FIG. 9B is a sectional view taken along the line 9B—9B of FIG. 9;

FIG. 9C is a sectional view taken along the line 9C—9C of FIG. 9:

FIG. 9D is a view from the end as seen along the line 9D—9D of FIG. 9:

FIG. 10 is a plan view of a heel ped similar to that of FIG. 9, but illustrating a third film added during heat sealing to form a tri-part ped;

FIG. 10A is a sectional view taken along the line 10A—10A of FIG. 10;

FIG. 12C is a sectional view taken along the line 12C—12C of FIG. 12:

FIG. 13 is a plan view of the completed full length ped of FIG. 12 after heat sealing and trimming have been completed;

FIG. 13A is a sectional view taken along the line 13A—13A of FIG. 13;

FIG. 15 is a plan view of a full length ped which may be made by injection or blow molding in accordance with this invention and in which there is a variable thickness between the heel portion and the forefoot portion and incorporating a sloping transition section in the shank area;

FIG. 15A is a sectional view taken along the line 15A—15A of FIG. 15;

FIG. 15B is a sectional view taken along the line 15B—15B of FIG. 15;

FIG. 15C is a sectional view taken along the line 15C—15C of FIG. 15:

FIG. 15D is a side view as seen along the line 15D—15D of FIG. 15;

FIG. 20 is a graph of the pressure trend over time of diffusion pumping in accordance with this invention in which nitrogen gas is captive and oxygen gas is mobile;

FIG. 21 is a graph which superimposes data from FIG. 20 and a portion of the data from FIGS. 17 and 18;

FIG. 22 is an enlarged diagrammatic sectional view of an improved barrier film in accordance with this invention in which the crystalline material is bonded securely to the elastomeric material;

FIG. 23 is a view similar to FIG. 22 in which the crystalline material is embedded in the elastomeric material;

DETAILED DESCRIPTION OF THE INVENTION

Figure 1:
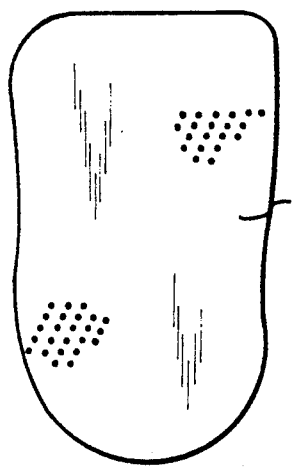
FIG. 1 is a plan view of an inflated heel-ped in accordance with the present invention for use, for example, in an article of footwear and incorporating a crystalline scrim or mesh embedded in the parent elastomeric film of the enclosure envelope.

Referring to the drawings which illustrate preferred forms of the present invention, except as noted, FIG. 1 illustrates an inflated heel ped 10 in accordance with this invention. The term "ped" for the purposes of this invention is defined as a load carrying cushioning device positioned in the heel or forefoot regions of footwear. As shown, the heel ped is in the form of an sealed envelope containing an inflatant captive gas. The envelope wall is formed of a barrier film material which permits diffusion through the film of the mobile gas(es) but which effectively prevents diffusion of the captive gas(es). In this form, the enhanced barrier qualities are provided by a crystalline barrier material imbedded in the parent polar, elastomeric and thermoplastic film material forming the pressure containing envelope. The internal pressure may vary widely from a few psig to as much as 30 or more psig. This heel ped may either be fully or partly encapsulated into a foamed sockliner of an article of footwear, or cemented into place within a preformed cavity within a sockliner or be fully or partly encapsulated into the midsole or outsole of an article of footwear. Of course, as is known in the footwear art, other locations and disposition of the ped and other cushion elements of footwear may be used.

A substantial number of heel peds, virtually millions of pairs, having the geometry illustrated in FIG. 1 have been used commercially and have been made in accordance with the prior patents identified. These prior peds, however, were fabricated with a 100% elastomeric material which did not act as a barrier for air gases, and the captive gas was one or more supergases. Typically the materials which may be used for the envelope of the prior devices, supergas inflated products, included polyurethane elastomer materials, polyester elastomers, fluoroelastomers, polyvinyl chloride elastomers, and the like. Polyurethane elastomer materials were preferred as the commercial material because of the superior heat sealing properties, good flexural fatigue strength, a suitable modulus of elasticity, good tensile and tear strength, and good abrasion resistance. Of course these properties are also present in the improved barrier materials of the present invention. Other materials include polyethylene terephthalate glycol (PET 9), Dacron 56 and the like.

In contrast to the envelope material of the supergas inflated products of the prior art, the envelope material of the present invention includes a considerable amount of crystalline material and has considerable lower permeability to fluids and gases as compared to the prior art envelope materials. The crystalline material, regardless of type and manner of incorporation, effectively blocks a large portion of the flow passages through which the inflatant gas must diffuse as it migrates outwardly through the film. Typical highly crystalline material which may be used are polyester materials, nylon materials, polypropylene materials, graphite, glass, Kevlar, metals and virtually any crystalline material. Materials of these types come in many forms which can be utilized in the products of this invention: thread-like fibers, filaments, chopped fibers, scrims and meshes, or uniformly distributed particulate or platelet crystalline materials, various types of knitted, woven, and non-woven cloth, expandable fabrics, whiskers, etc. Other material which may be used are: amorphous graphite cloth, filament or whiskers; mica; Aramid or Kevlar cloth, filaments or whiskers; metallic cloth, filaments or whiskers, for example steel or aluminum; nylon or polyester or glass or PET cloth, filaments or whiskers. Various metals and metal alloys may be used in the form of filaments, powder, platelets, cloth, beads and micro-spheres and the like. Such materials are well-known to the reinforced-plastics industry for other applications. It is to be noted, however, that the use of the crystalline materials is not for the primary purpose of reinforcement in accordance with the present invention since many of the useable materials and the form of the materials do not appreciably contribute to film strength.

Figure 2:
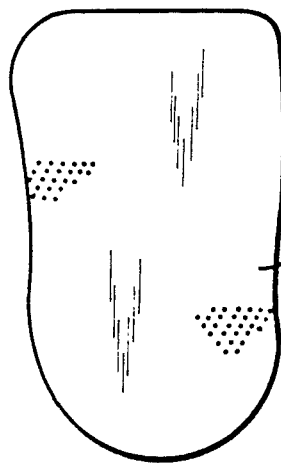
FIG. 2 is a plan view of device similar to that of FIG. 1 but illustrating the use of a more closely spaced scrim crystalline material.
Figure 3:
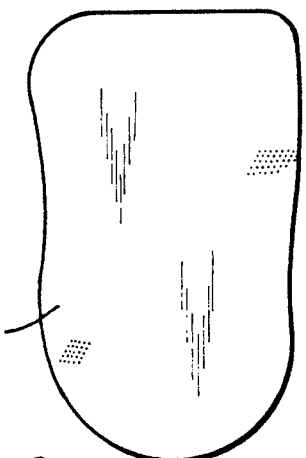
FIG. 3 is a plan view of a device similar to that of FIG. 2 with an even more closely spaced scrim crystalline material.

The heel peds 12 and 14 of FIGS. 2 and 3 are similar to the heel ped of FIG. 1 except that each contains successively more barrier crystalline material. The effect of spacing of the barrier materials is shown more clearly in FIGS. 4, 4A and 5 and 5A where a thread-like barrier 15 is diagrammatically shown imbedded within the parent thermoplastic elastomeric film 17. As shown, the material 15 is disposed between the opposing surfaces 19 and 20 of the film. By this arrangement, the surfaces are principally and entirely parent elastomer material and may thus be readily heat sealed by R-F welding and the like to form a sealed envelope. If the thread-like barrier material was present on the surface, there would be some difficulty in sealing the envelope if formed of preformed sheet.

Figure 4:
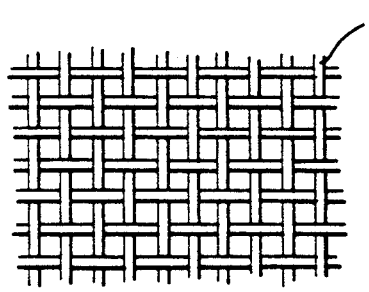
FIG. 4 is a plan view schematic diagram of a crystalline thread-like material embedded in the parent envelope film.
Figure 5:
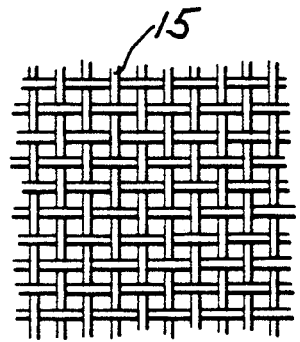
FIG. 5 is a plan view of a crystalline thread-like material with closer spacing between the threads embedded in the parent envelope film.
Figure 4A:
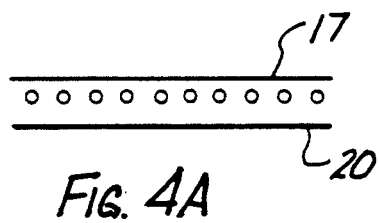
FIG. 4A is a view in section taken along the line 4A—4A of FIG. 4.
Figure 5A:
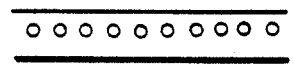
FIG. 5A is a view in section taken along the line 5A—5A of FIG. 5.

The barrier material of FIG. 5 has closer spacing of the fibers 15 in the film 17 and thus more flow-blockage (70 percent crystalline) as compared to barrier material of FIG. 4 (55 percent crystalline fibers). Therefore the rate of diffusion and diffusion pumping of the mobile gas would be lower in the FIG. 5 embodiment than in the FIG. 4 form. The diameter of the fibers and the cross-section geometry can also be changed to adjust the rate of diffusion. In addition, the type of barrier material chosen for the design can effect the rate of diffusion pumping. For instance, diffusion would be lower with graphite scrims than polyester scrims. As can be seen in the cross-sections of FIGS. 4, 4A, 5 and 5A, it is beneficial to have the crystalline material close to the outside surface of the film, but located beneath the film surfaces so as to have as large a portion as possible of elastomeric material on the surface so as to achieve the best possible heat-seal joint or weld between the sheets of film. It is understood that the crystalline fibers may protrude partially from only one surface thus providing essentially a two-sided film. In that case, sealing must be between the one side of the surfaces from which the fibers do not extent. It is preferred in accordance with this invention that the barrier material be one-sided, i.e., the crystalline material should be completely imbedded in the film. This eliminates the need to assure that the proper surface of the film materials are in facing contact when forming envelopes initially from sheet materials.

Figure 6A:
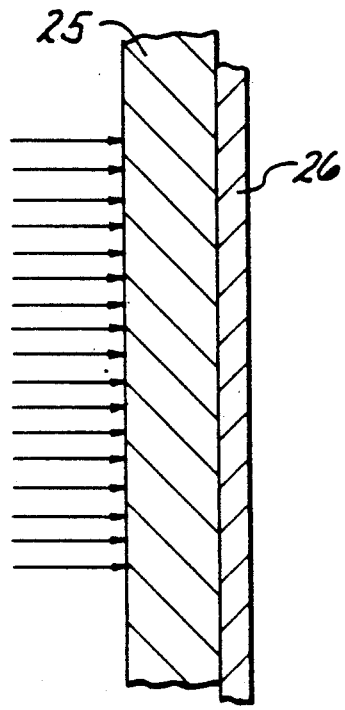
FIGS. 6A and 6B are sectional views illustrating an early, and unsuccessful, attempt to laminate a barrier film to an elastomeric film for a pressurized cushioning device.
Figure 6B:
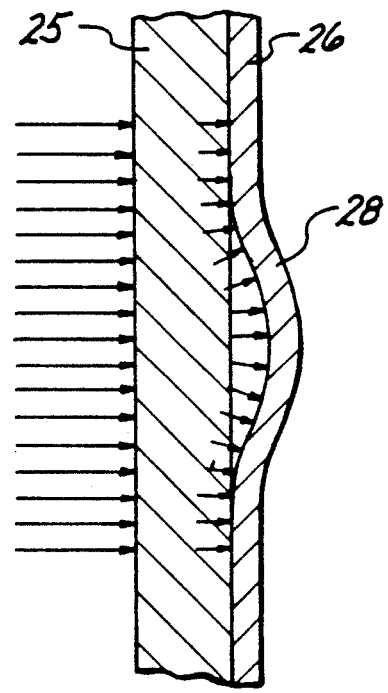

It is also important to have the elastomeric material surround the crystalline material sufficiently in order that the two be intimately connected thereby avoiding the separation of the two types of material in service. Such separation did occur early in the development program for this invention. In that case, an attempt was made to incorporate crystalline barrier materials with the elastomeric material using co-extrusions or co-lamination of the two types of plastics. FIGS. 6A and 6B, which do not represent forms of this invention, illustrate the unfortunate result of such an approach. A portion of the pressurizing gases diffused outwardly through the inner layer of elastomeric film 25 and were blocked by the outer layer 26 of barrier film. Pressure against the outer layer 26 caused the two layers to separate as seen in FIG. 6B with the result that the barrier layer ballooned, as seen at 28, outwardly thereby failing either by bursting or by forming a large aneurysm.

Therefore, it became necessary to improve the approach by submerging or imbedding the crystalline material intimately into the parent elastomeric layer. Initially a scrim was imbedded in urethane material known commercially as MP-1790 AE urethane (XPR-396 of Uniroyal, Inc.) by extruding the thermoplastic material onto a 10×10 course woven (10 strands per inch in each direction) nylon mesh, basically an open type of mesh. The results were quite good. However, the modulus of elasticity of the scrim was too high relative to that of the parent material, i.e., the plastic film stretched more than the scrim. This resulted in some wrinkling and distorting of the composite film during heat-sealing and inflation. Such distortions resulted in stress concentrations within the inflated envelope and reduced the flexural fatigue life of the part. Fatigue ruptures occurred in the most highly stressed areas, i.e., near the heat-sealed weldments.

For inflated cushion products using cloth, scrims or meshes in accordance with the present invention, it is important that 1) the physical properties of the crystalline fibers (especially modulus of elasticity, slope of the stress-strain relationship and yield stress), 2) the geometry and density of the crystalline elements themselves, 3) the arrangement (spacing and orientation) of the fibers within the elastomeric material, be such that at the design internal pressure levels (stress levels) the crystalline elements at the highest stress regions will have been stressed beyond their yield point. Such yielding (beyond the elastic range) redistributes and evens out the loads throughout the enclosing envelope of the inflated product. Approximately 20% of the fibers should be stressed beyond the yield point. None of the elastomeric material operates beyond the yield point.

After the early test previously referred to, a cushion product was developed and successfully tested and incorporated some of the design features mentioned. In this instance, the crystalline mesh was a tighter weave of smaller diameter and low denier fibers. When inflated to design pressure some of the mesh (adjacent to highly stressed regions around the weldments) yielded and some permanent set resulted. This particular product retained the desired air pressure for an extremely long period of time (more than about ten years) and has not lost any measurable pressure. The fatigue resistance was good and the inflated shape of the cushion was excellent and without objectionable distortions of the envelope.

Figure 7:
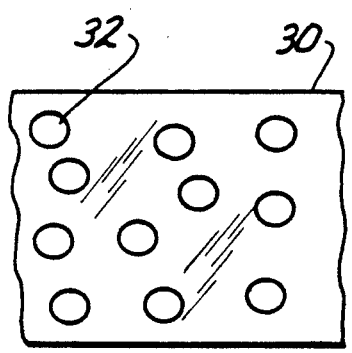
FIG. 7 is a diagrammatic plan view showing another form of the present invention incorporating a particulate crystalline material within the parent elastomeric material.
Figure 7A:
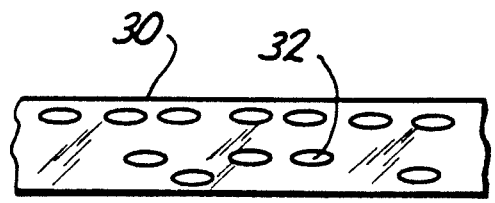
FIG. 7A is a sectional view taken along the line 7A—7A of FIG. 7.

FIG. 7 shows another form of the present invention in which the elastomeric material 30 includes a multiplicity of individual crystalline elements 32 in the form of platelets essentially uniformly dispersed throughout the host elastomer. In this embodiment the small planer platelets are mixed with the elastomeric polymer and extruded or blown with the polymer into sheets of film. These sheets are in the thickness range 0.005 to 0.050 inches. During this process the platelets 32 align parallel with the surface of film as seen in FIG. 7B, thereby more effectively forming a barrier arrangement.

The various techniques for imbedding a crystalline element into the parent film include: 1) extruding the parent material onto a scrim or mesh, 2) coating cloth made from crystalline fibers with the parent material (normally both sides are coated), 3) mixing the polymer of the parent film with various forms of barrier material (i.e. flakes, thread-like fibers, chopped fibers, whiskers, platelets, etc.) and extruding or blowing the mixture into a film or sheet and 4) either intimately blending or co-polymerizing the elastomeric polymer with the crystalline material. Some of these procedures have already been discussed, others will be discussed below.

It is important at this point to explore the practical limits for the applications of controlled diffusion for inflated devices in accordance with the present invention. With products of this type and for practical commercial utility it is important and essential to have an appropriate and optimized balance between: 1) The minimum rate of activated diffusion on the one hand and 2) such physical properties as fatigue resistance, manufacturing processability, and heat-sealability on the other hand. Because of the necessity for achieving such a compromise, it is probably not practical to have such a high concentration of crystalline materials so as to form a 100% barrier against diffusion of all gases. The major exception is oxygen. Other gases, including nitrogen and the supergases, can be effectively prevented from diffusing through the enclosure envelope of the inflated devices, and still maintain the essential elastic fatigue resistant characteristics of the barrier envelope material.

The fact that oxygen can diffuse through the envelope is not a problem, and is, in fact, a desirable and unique benefit. This is an important, novel concept for this invention. For example, the product can be inflated with a mixture of nitrogen and/or supergas or air. After inflation with nitrogen and/or supergas, the oxygen of the ambient environment can diffuse into the envelope through the mechanism of diffusion pumping. Thus, the partial pressure of oxygen is added to the partial pressures of nitrogen and/or supergas already contained within the envelope, with the result that the total pressure of the product rises. The partial pressure of oxygen in the ambient atmosphere is about 2.5 psia (out of a total pressure at sea level of 14.7 psia). Thus, the reverse diffusion of oxygen gas into the envelope will cause a maximum rise in pressure about of 2.5 psia. Such a rise in pressure is useful in offsetting the substantial tensile relaxation of the envelope (with resultant increase in the internal volume of the enclosure) where all of the gas components of air diffuse into the envelope. Thus, a novel feature of this invention is that the composite material of the envelope is a semi-permeable membrane to the gases in air other than nitrogen and is therefore not a complete gas barrier. The practical advantage is that the maximum volumetric and dimensional change in the product is between 3% and 5% because the maximum increase or change in pressure with respect to the initial inflation pressure is the partial pressure of oxygen.

If cost is of paramount importance, the inflatant gas can be 100% nitrogen and the same phenomenon of reverse diffusion of oxygen gas into the envelope will occur. Also a mixture of nitrogen plus 2.5 psia of oxygen can be useful in some applications. In addition, 100% of air can be used. In this case it is necessary to initially over-inflate the device if the partial pressure of oxygen in the device exceeds 2.5 psia to offset the increment of the difference, a pressure loss of between the actual partial pressure of oxygen within the enclosure and 2.5 psia.

There are many advantages in controlling the rate of diffusion pumping in inflated elastomeric devices such as components for footwear, shock-absorbers, cushioning elements for packaging and shipping purposes, helmets, athletic protective gear/padding, military boot, etc. One advantage is the ability to maintain the product at design inflated pressure for longer periods of time than would otherwise be possible. As an example, most presently made inflated footwear components, which are sold throughout the world, are made from ester-base polyurethane film because it has lower permeability with respect to supergas than ether-based polyurethane film, and thus has a acceptably long service life in footwear, However, ester-based film has the disadvantage that it may be much more adversely affected by moisture (hydrolysis instability) than the ether-based counterpart. In the current commercial form of footwear, protection against moisture is achieved by encapsulating the inflated component in a foamed midsole. This operation is costly and the foam of the midsole, while it increases fatigue life of the composite product, tends to detract from the beneficial cushioning and energy return properties of the inflated product and greatly adds to the weight of the shoe. By imparting a crystalline property to the barrier film, e.g., the ether-based film, the latter may be used in footwear having long service life and the moisture degradation problem is largely eliminated.

Another example of the advantages of the improved barrier film material of this invention is the "cold-cracking" problem. The prior art supergas inflated products when exposed to low environmental temperatures of below about 10 degrees F. tend to develop fatigue cracks in the elastomeric film and become flat. Special film materials may be developed to reduce the cold-cracking problem. However, these film materials more suitable for cold temperature tend to become more permeable to the pressurized gas at room temperature. The permeability may be reduced, in accordance with this invention, by incorporating crystalline components or molecular segments to the elastomeric film to restore the loss of permeability caused by attempting to reduce the effects of cold-cracking and which may also result in greater gas permeability.

One of the practical advantages of controlling permeability and diffusion pumping relates to matching the tensile relaxation properties of the product with the changes in pressure due to retention of the captive gas and diffusion of the mobile gas. For example, in some products it is desirable to use a film either with a lower modulus of elasticity or thinner gage to provide a softer feel to the cushioning device. With lower gage or lower modulus, there is a greater tendency for the captive gas to diffuse through the film. To compensate for such loss, the device may be over-inflated slightly. However, due to the thinness or modulus of the film, the envelope tends to enlarge to a greater extent than would be the case with thicker films or those of higher modulus. This increased growth, tensile relaxation or creep, provides a product whose geometry is not quite that desired or which changes over time. By adding a crystalline material to the film material, the modulus of elasticity is increased and also the flow of the captive gas is reduced and the product is able to maintain inflatant pressure with a comparatively small change in configuration without the need to over inflate the product.

Figure 11:
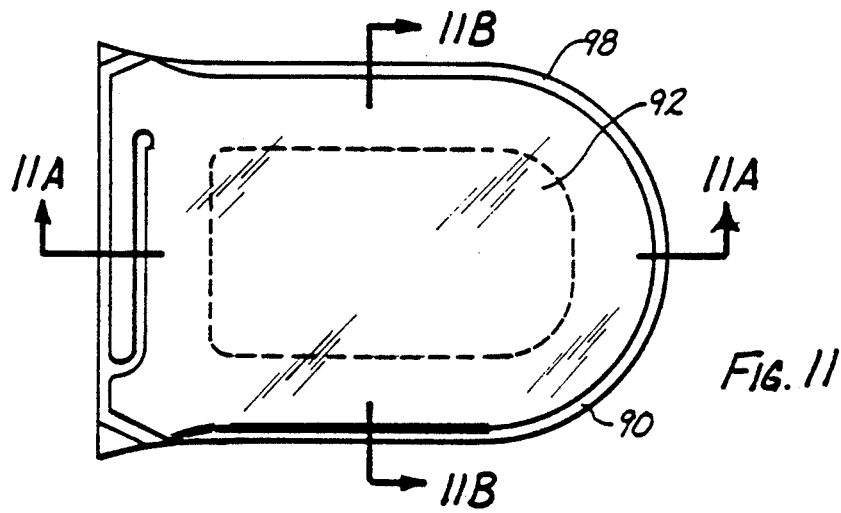
FIG. 11 is a plan view of a heel ped similar to that of FIG. 8 with an added tensile element assembled to the ped prior to final perimeter heat sealing.
Figure 11A:
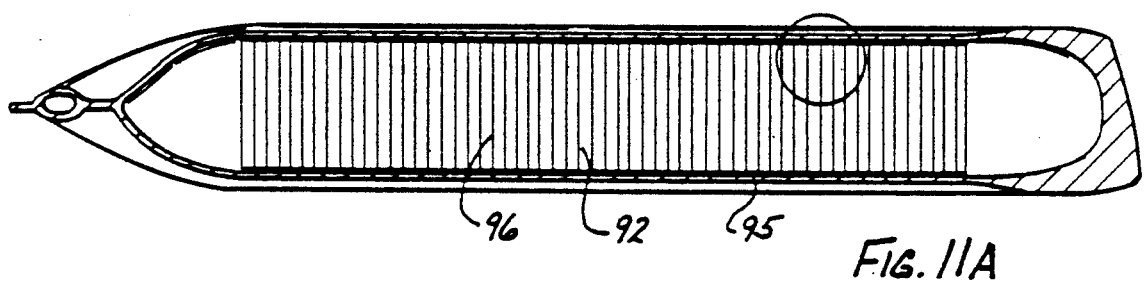
FIG. 11A is a sectional view taken along the line 11A—11A of FIG. 11.
Figure 11B:
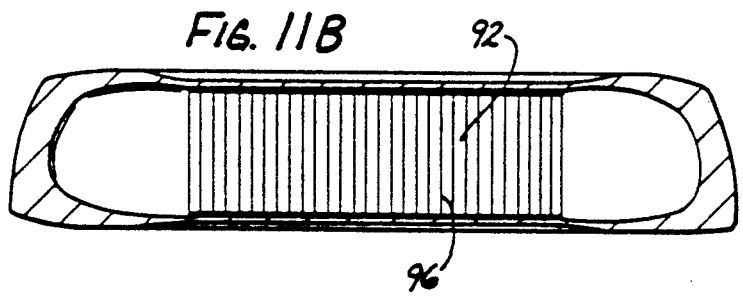
FIG. 11B is a sectional view taken along the line 11B—11B of FIG. 11.
Figure 11C:
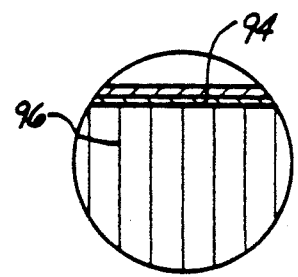
FIG. 11C is an enlarged fragmentary sectional view of a portion of the assembly illustrated in FIG. 11A.

On the other hand, there are certain types of products, such a tensile-type units, see FIGS. 11, 11A and 11B of the application previously identified, which tend to over inflate in the first 3 to 6 months of inflation since the nature of the part is such that there is very little enlargement of the envelope. Since the internal volume of the product cannot change as other products do, the diffusion of air into the elastomeric and non crystalline envelope causes over pressurization. While one could store these products for 3 to 12 months to achieve a steady state inflation pressure, this is not practical from a commercial view point. If crystalline molecular segments are included in or added to the material used to form the tensile type products, less expensive captive gases may be used and light weight and less expensive envelope materials may be used. The following table compares two supergases with less expensive captive gases that effectively act as supergases in accordance with this invention.

One cubic foot of gas or vapor at 25 psig and 70 degrees F.

| | LBS/FT$^3$ OF VAPOR OR GAS AT 25 PSIG AND 70 DEGREES F. | DOLLARS PER LB. |
|---|---|---|
| Hexafluoroethane (Supergas) | 1.00 | $7.19 |
| Sulfurhexafluoride (Supergas) | 1.05 | $5.90 |
| Nitrogen | 0.19 | $0.09 |
| Air | 0.20 | zero |

Although not classed as supergases, air and nitrogen have been added to the table above because, from the standpoints of availability, cost and weight they are excellent inflatant candidates. In order fully to utilize these gases, upwards of 70 percent by weight of the envelope film may be crystalline. Thus, the weight of parent thermoplastic material would be reduced proportionally. However, it is understood that the use of very small percentages of crystallographic material are included within the scope of this invention, so as to control the diffusion of both oxygen and nitrogen gas as both are mobile gases. Addition of crystalline materials to the costly elastomeric materials can produce a composite material with substantial cost savings over using 100% elastomeric polyurethane, for example.

A good way to visualize some of the above concepts of using a composite material comprising both elastomeric and crystalline components or segments is to think of the elastomeric material as the matrix which binds together the crystalline elements. The elastomeric material provides good fatigue resistance and the desired physical properties of modulus of elasticity, elongation, manufacturing processability and heat-sealability. The crystalline components provide the enhanced gas diffusion barrier. In this way, the elastomeric properties of the composite structure exist up to the boundaries between elastomeric and crystalline elements of the structure. Thus, the crystalline materials do not have to bend and flex to any significant degree and are not subject to fatigue stresses. Heat-sealability is accomplished within the elastomeric portion of the composite.

Next, attention should be directed to FIGS. 8 through 16F which illustrate various inflated products in accordance with this invention. FIGS. 8 to 8E illustrate a heel wedge 50 as the latter is removed from a mold in which the envelope 53 is initially formed. The wedge 50 includes a curved rear wall 54 integrally formed with top and bottom walls 56 and 57, the latter being thinner than the rear wall for added cushioning and flexibility. Integrally formed with the top, bottom and rear walls are side walls 58 and 59, the latter including portions 58a and 59a which are thicker than the top and bottom walls. As illustrated, the thicker portions of the envelope are joined to the thinner portions by transition sections. Portions 58b and 59b of the side walls are thinner than portions 58a and 59a. As shown, the rear wall 54 is slightly angled along its outer peripheral surface 54a for strength and rear foot support and stability. Visibility of the cushioning product is also an important marketing consideration. As removed from the mold, the front end 62 of the wedge is open. It is understood that the material of envelope contains both elastomeric and crystalline materials, as described.

In the next operation, illustrated in FIGS. 9 to 9D, the envelope 50 is processed to form multiple chambers, filled with a captive gas and sealed. As seen in FIGS. 9 and 9A, the chambers 61-66 extend between the side walls and are joined to chambers 67 and 68 (see FIG. 9C) which extend along the side walls. The various chambers are formed by R-F welding to provide webs 70 between the adjacent chambers. It is understood, however, that other form of heat sealing may be used, as is known in the art. R-F welding is preferred.

Also, in some cases, it is desirable (as with "blow molding") to eliminate the separate R.F.welding step. This is accomplished by having the side sections of the mold move inwardly during the molding procedure to form the webs 70. Thus, the envelope material from opposite sides of the cushioning device is shaped and pressed together while the envelope material is semi-molten, viscous or sticky. The clean, semi-molten, sticky or tacky inner elastomeric surfaces are held in contact, under pressure, until the materials fuse and cool. This procedure therefore replaces the previously described R.F. welding step. It has been found that the reliability of these welds can be substantially improved if the surfaces to be joined are primedas by injecting a "coupling agent" such as Dow Silane X 16106 as a vapor, into the pressurizing gas used in the blow molding procedure. Further, for certain very severe fatigue applications, a secondary R.F. welding step can be added to the manufacturing procedure to create a weldment that exceeds the durability of the adjacent parent film.

The front end is also R-F welded to form a sealed front end 72 and portions 72a and 72b are trimmed. An inflation tube, not shown, may be attached to chamber 66 for inflation with a captive gas, as described, and then sealed off, as is known in the art. The chambers may all be in fluid communication with each other to provide an inflated cushioned heel wedge for use in footwear. However, the chambers may also be independent chambers, pressurized at different pressure levels. In the next few months after initial inflation, oxygen gas will diffuse from environmental air into the sealed envelope to increase the pressure(s) by about 2.5 psi. The initial pressure level will be largely determined by the cushioning level desired. Typically a final steady state pressure of between 20 and 30 psig is satisfactory. In some instances, it may be desirable to inflate initially to a greater or lesser pressure, the final steady state pressure being about 2.5 psi over the initial pressure.

One of the important advantages of this invention is apparent from the device of FIG. 9. As noted, there is no substantial expansion of the envelope over the period of diffusion pumping. The overall dimensions of the envelope remain within about 3 to 5% of the original dimensions. Thus, the shape and geometry of the part remain fairly constant over the period of from initial inflation, through diffusion pumping and through the useful life of the product.

FIGS. 10 and 10A illustrate a variation of the heel wedges described in that the wedge 75 is formed essentially of three parts, the third part 78 being a film material of the type described and which is heat sealed to portions of the sheets 79 and 80. The third or intermediate sheet 78 of elastomeric material is positioned between barrier members 79 and 80 of the previously formed part prior to welding. In this form, some of the welds 81, 81a, 82, 83, 84 and 85 are on the upper portion, while other welds 81, 86, 87, 88 are on the lower part. There is also a peripheral chamber and all the chambers are interconnected. This particular form of the invention also indicates the relatively complex parts and products that may be fabricated in accordance with this invention. In making the part just described, it is necessary either to preform the welds 81a, 82, 83, 84 and 85 in a sequential fashion, or to introduce a release agent in the appropriate locations so that only two of the three sheets will join together.

Figure 11D:
FIG. 11D is a view from the end as seen along the line 11D—11D of FIG. 11.

FIGS. 11 through 11D illustrate a tensile type of heel wedge 90 which contains a single chamber but which incorporates a tensile element 92. The advantages of this type of product are described in detail in the prior application referred to above. In addition to those advantages, the tensile type product of this invention offers advantages over and above the prior tensile type product. The tensile element 92 may be of nylon or polyester having a first and second surface portion 94, 95 with tensile filaments 96 extending between the two. Representative fabrics that may be used are three dimensional, lock stitch or woven, or double needle-bar Raschel knit products. The outer envelope 98 may be of any of the improved barrier materials herein described and the spaced surface portions 94 and 95 are affixed to the top and bottom wall of the envelope. The front end 99 is sealed and the envelope is initially inflated with a captive gas which may be any of those mentioned. The tensile elements 92 maintain the top and bottom walls of the inflated product in essentially parallel or contoured relation. During diffusion pumping, oxygen gas diffuses through the envelope to increase the internal pressure by about 2.5 psi, but the top and bottom walls remain parallel or contoured. The advantage which the tensile product of this invention has over that previously described is that the effect of tensile relaxation is largely controlled. The dimensional tolerances of the part are very stable and the product is not over inflated.

This product is unique from the other products described in that it achieves 100% pneumatic support without detraction of non-supporting weldments joining together the upper and lower barrier surfaces in the load supporting areas.

The inflated size, shape, and geometry of this tensile product is very precisely controlled, and it cannot grow or enlarge significantly even when pressurized to unusually high pressures, i.e., 100 to 200 psig. Likewise, the diffusion pumping is precisely controlled. The finished product is therefore able to be adapted easily into high speed "turn key" automated manufacturing procedures. The product is also able to withstand extreme manufacturing environments much better than was possible with the prior art products. Furthermore, this tensile product retains the precise and desired level and degree of cushioning, compliance and resiliency throughout its significantly extended lifetime, as compared with the prior art products.

Steady state internal pressure is reached within a few months and at a level which is about 2.5 psi over the initial pressure, assuming supergas or nitrogen is used as the initial inflatant captive gas. If air is used as the initial inflatant gas, the pressure tends to drop, as earlier discussed. The important fact is that the product does not significantly change configuration or dimension and reaches the desired steady state inflation pressure in a relatively short time. The latter is important in the manufacture of footwear on a commercial basis and through the use of automated equipment.

Figure 12:
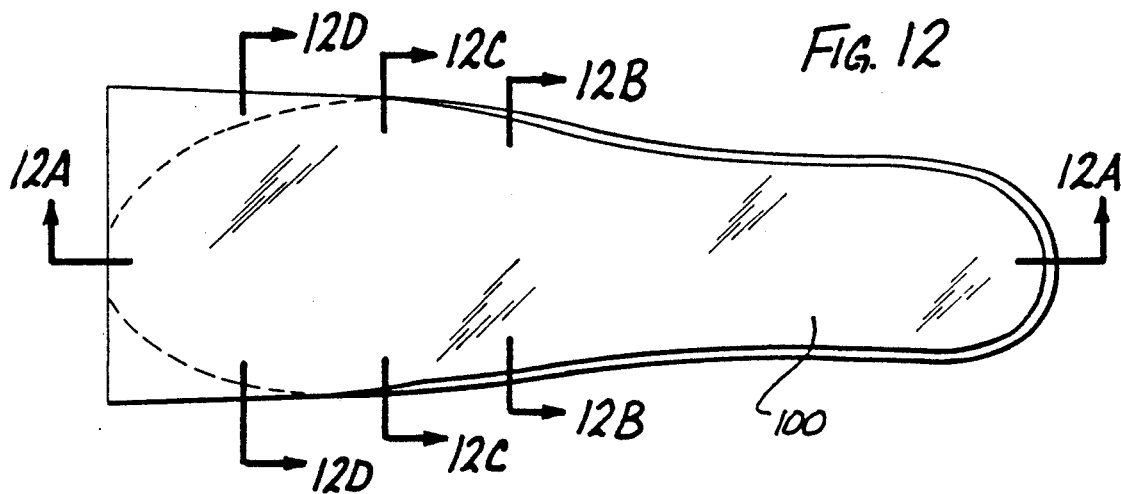
FIG. 12 is a plan view of a full length ped in accordance with the present invention illustrating the product as it is removed from the mold.
Figure 12A:
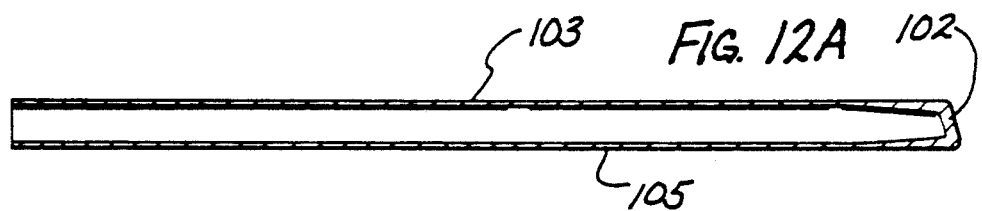
FIG. 12A is a sectional view taken along the line 12A—12A of FIG. 12.
Figure 12B:
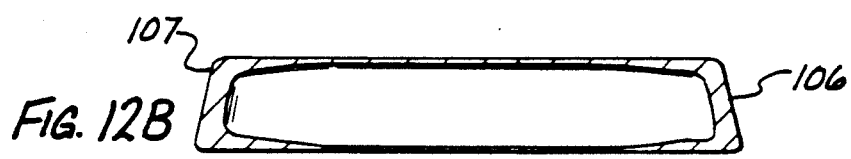
FIG. 12B is a sectional view taken along the line 12B—12B of FIG. 12.
Figures 12D, 12E:
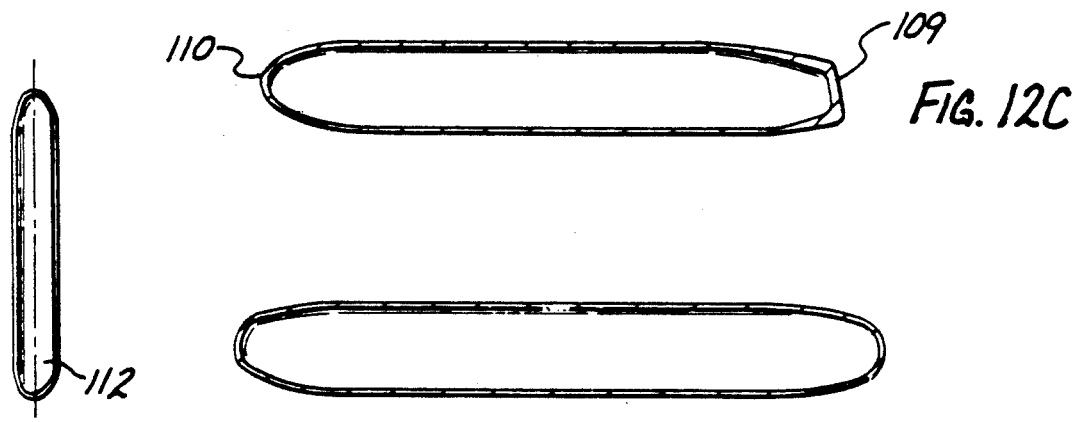
FIG. 12D is a sectional view taken along the line 12D—12D of FIG. 12.
FIG. 12E is a view as seen from the left of FIG. 12.

FIGS. 12 through 12E illustrate a full length and inflated sole element 100 in accordance with this invention as the latter is removed from the mold. The rear wall 102 is curved and slanted, as already described and somewhat thicker than the top and bottom walls 103 and 105. Portions of the side walls 106 and 107 along the mid-section are thicker than the forward portion, as seen in FIG. 12D. Moreover, the side wall portion 109 on the inside of the foot is thicker than the side wall portion 110 on the outer side of the foot, as seen in FIG. 12C. The front end 112 is open and the entire structure is essentially planer, as contrasted to being tapered. The open end 112 as shown in FIG. 12E is bell-mouthed in shape to allow withdrawal of a mandrel if injection molding is used. However, if the part is blow molded, this would not be required.

FIGS. 13 and 13A illustrate the finishing operations which include heat sealing to form a plurality of spaced chambers 113 separated by a plurality of webs 114. The front end is also peripherally sealed and parts 115a and 115b are trimmed away to provide a rounded front end. The envelope is then initially inflated with a captive gas, as described and the fill section is sealed. When assembled to footwear, the full sole element may permit the chambers to be seen through the side wall, i.e., a visible inflated cushion.

It is understood that these devices may be compartmentilized in any desired arrangement, with each separate chamber pressurized at the same or at any different desired pressurized pressure level. Conversely, some or all of the chambers may be joined by narrow sonic venturi or similar flow restricting passages.

Figure 14:
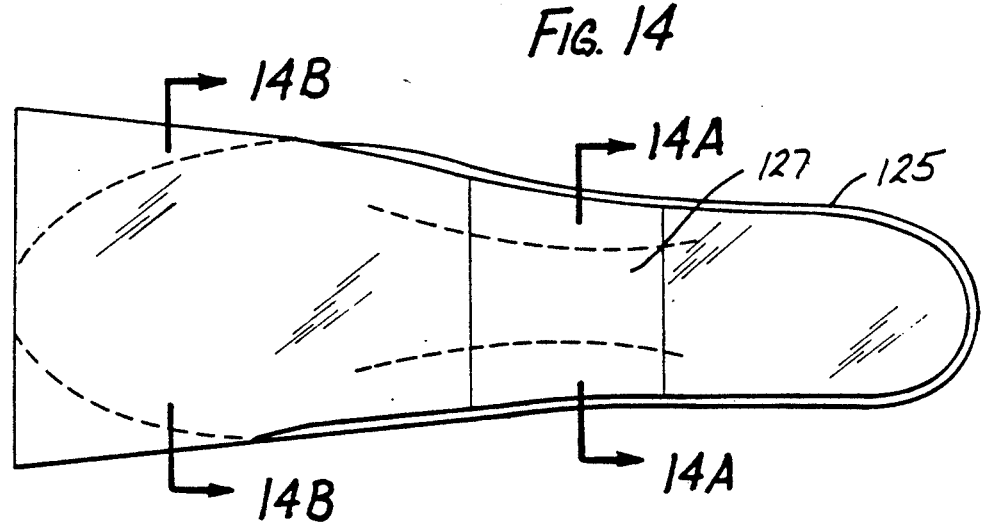
FIG. 14 is a plan view of product in accordance with this invention which may be fabricated by injection or blow molding, for example, and in which the mold has been modified to assist removal of the part from the mandrel.
Figure 14A:
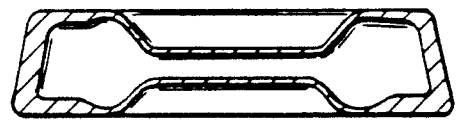
FIG. 14A is a sectional view taken along the line 14A—14A of FIG. 14.
Figure 14B:
FIG. 14B is a sectional view taken along the line 14B—14B of FIG. 14.
Figure 14C:
FIG. 14C is a view from the end as seen along the line 14C—14C of FIG. 14.
Figure 14D:
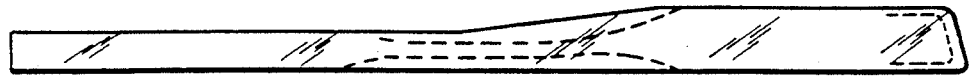
FIG. 14D is a side view as seen along the line 14D—14D of FIG. 14.

FIGS. 14 through 14D illustrate a full sole product 125 which may initially be formed by injection or blow molding. In general the product is similar to that of FIG. 13 except that there is a sag portion 127 between the side walls (see FIG. 14A) and the sole has a tapered configuration. The sag portion moves out of the way to permit extraction of the mandrel. The product, after initial formation, is then processed to provide a a cushioning device as illustrated in FIGS. 15 through 15D.

The finished product is inflated and includes a variable thickness profile, the thickest portion 130 being in the heel section, the thinnest being the forefoot portion 135, the latter being interconnect by a sloping transition section 137. The various drawings also illustrate a plurality of chambers 138 with the webs 139 which extend transversely and communicate which peripheral chambers 140 and 141.

Figure 16:
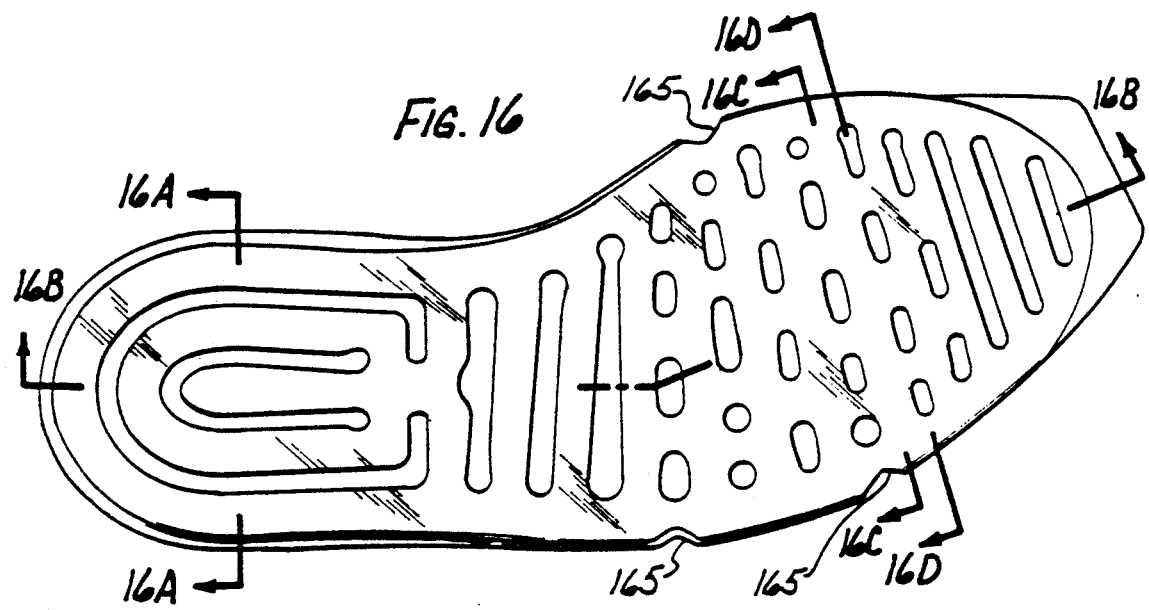
FIG. 16 is a plan view of another form of a full sized ped in accordance with the present invention and which may be formed by blow molding or vacuum forming or slush casting and incorporating a high heel portion and side indentations for lateral bending flexibility.
Figure 16A:
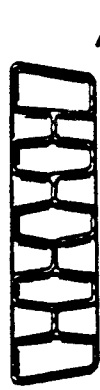
FIG. 16A is a sectional view taken along the line 16A—16A of FIG. 16.
Figure 16C:
FIG. 16C is a sectional view taken along the line 16C—16C of FIG. 16.
Figure 16D:
FIG. 16D is a sectional view taken along the line 16D—16D of FIG. 16.
Figure 16F:
FIG. 16F is a view in perspective of the side indentations present for lateral flexibility.
Figure 16B:
FIG. 16B is a sectional view taken along the line 16B—16B of FIG. 16.
Figure 16E:
FIG. 16E is a side view as seen along the line 16E—16E of FIG. 16.

FIGS. 16 through 16F illustrate a product in accordance with this invention which may be formed by blow molding or by vacuum forming techniques or from separately formed sheet materials. Blow molding, however, is the preferred technique. The film thickness of this form of the invention regardless of how formed, like the thinnest film thickness of the other forms, may be from 5 mils to 50 mils, but film thicknesses in the range of 20 to 25 mils are preferred.

The full length inflated sole 150 includes both generally transverse chambers 151 and generally longitudinal chambers 153 in the heel portion 155. The heel portion is thicker than the forefoot portion 156, the two portions being joined by a tapered transition section 158. As already described the various chambers are separated by weld bands 160. In some cases, the weld sections are relatively short sections 162, see FIG. 16D. The general transverse orientation of the welds and chambers in the forefoot region tends to promote flexibility whereas the heel portion does not require the same type of flexibility. To promote forefoot and lateral flexibility, there are sidewall flex notches 165 provided in the form of truncated apertures with the small diameter ends adjacent to each other as shown. Both of the above measures decrease the cross-section moment of inertia of the midsole to cause the shoe to flex easily during the toe-off phase of running.

Like the other forms of this invention, the inflated product is made of an envelope which is an improved barrier for captive gases and a permeable barrier for the mobile gases mentioned. As in the other forms, there is a peripheral chamber on the medial and lateral side and the various chambers are all interconnected.

While the various forms illustrated show intercommunicating chambers with essentially free flow of the captive gas and the mobile gas between the chambers, it is understood that the various compartments may be partially connected with flow-restricted passages, or the product may be formed of chambers which are fully independent of other chambers, inflated to different pressure levels and inflated cushions that have only a single chamber as in the tensile product of FIG. 11.

The various products described in these figures are designed to be used as midsoles of articles of footwear, primarily athletic and leisure shoes. In such an application these inflated products may be used in any one of several different embodiments: 1) completely encapsulated in a suitable midsole foam, 2) encapsulated only on the top portion of the unit to fill-in and smooth-out the uneven surfaces for added comfort under the foot, 3) encapsulated on the bottom portion to assist attachment of the outsole, 4) encapsulated on the top and bottom portions but exposing the perimeter sides for cosmetic and marketing reasons, 5) same as item (4) but exposing only selected portions of the sides of the unit, 6) encapsulated on the top portion by a molded "Footbed", 7) used with no encapsulation foam whatsoever.

In addition to the addition of crystalline materials to a host elastomer, crystalline properties may be imparted by other techniques. One is to laminate different materials together, but this must be done carefully to prevent delamination of the components. For example, laminated products have been used in the packaging industry to prevent passage of oxygen gas into a sealed package. These packaging laminates are generally not satisfactory for the present invention since the composites have poor heat seal qualities or rapidly fail due to cracking caused by fatigue loading.

One process which has operated satisfactorily was the co-lamination of polyvinyl vinylidene chloride copolymer and a urethane elastomer film. The inflated cushions fabricated from such material had acceptable barrier properties, but the composite delaminated under pressure. It was discovered that if an intermediate bonding agent such as silane X-b 1-6106 or PAPI 50 is used, the proper time-temperature relationship was observed during the lamination process, results could be improved. Such time and temperature control involved the use of a heated platen press, coupled with a cold press which can freeze the different materials together under pressure.

In addition to the methods described for increasing the crystalline content of the parent elastomeric film by mixing in discrete pieces of particulate crystalline material or by joining the elastomeric material to structural elements of crystalline material, there are other approaches. One approach, mentioned above, is on the molecular scale. This approach involves blending or co-polymerizing the parent elastomeric polymer with highly crystalline polymers as polyethylene terephthalate (PET), acrylic copolymers, polyvinylidene chloride copolymers, polyester copolymer elastomers, ultra thin liquid crystal densely packed fibrous molecular chains, polyurethane-nylon blends and other polyurethane blends, for example.

Other approaches involve the use of: vacuum deposited glass, less than 500 Angstroms thick, on to an ultra-thin flexible layer of polyethylene terephthalate (PET), in combination with a polyurethane elastomer film material; ultra-thin liquid crystal polymer layer(s) within the elastomeric matrix, consisting of densely packed fibrous molecular chains; acrylic polymers with urethanes; elastomeric and crystalline alloys; glass filled thermoplastic urethanes such as "Elastollon" from BASF Corp.; fiberglass filled or reinforced thermoplastic urethanes; copolyesters of the hard crystalline segments of thermoplastic polyurethanes and thermoplastic elastomers; thermoplastic elastomers having appropriate proportions of soft rubbery components in combination with hard glassy crystallographic materials such as (1) thermoplastic copolymers of polyethers and esters such as alternating block polymers of soft rubbery polymer segments with hard glassy crystalline PET polymer segments, (2) styrene (crystalline)/butadiene (rubbery)/styrene (crystalline) block polymers; thermoplastic polyolefin elastomers, including blends of ethylene-propylene rubber with crystalline polypropoxylene; chlorinated polyethylene (crystalline) and ethylene vinyl acetate copolymer (EVA) (rubbery); chlorobutyl rubber (rubbery) and polypropylene (crystalline); copolymers of polyethers and amines; polyurethane hyper blends such as polyurethanes and nylons; styrene block copolymers in combination with different elastomeric mid-segments, such as (1) polybutadienes, (2) polyisopropenes, (3) ethylene butadienes, (4) ethylene propylenes such as Kraton D and Kraton G. Other materials include polyesters, rayon, Kevlar, acrylic materials, nylons of the various types, polypropylene, polyesters of all types, cotton, wool and mixtures thereof.

In addition, another approach for achieving an improved barrier enclosure for control of diffusion pumping is the use of vacuum metallizing or vacuum deposition of a thin metallic layer on one or both surfaces of the elastomeric element. Such a metallic layer needs to be only a few millionths of an inch in thickness in order to be effective. The metal deposit may be on either the outer or inner surface of the film, with the inner surface being preferred. Also, it can be used as a laminate between two elastomeric sheets. Good bonds may be achieved between mating elastomeric layers using conventional bonding processes, other than R.F. bonding techniques.

Early in the development of this invention, blends were compounded of crystalline and elastomeric materials for controlling diffusion of an inflated product. These attempts to impart crystallinity by molecular blending were not entirely successful in that the resultant products did not possess some of the properties deemed important to the practice of the invention, For example, blends of polyvinyl chloride and elastomeric urethane produced fils that had good dielectric properties for R-F welding and good fatigue resistance. The diffusion rates of the gases was lower than that of urethane alone. The difficulty was tensile relaxation or creep in that the inflated products would gradually grow in size under pressure and eventually explode. This was especially true in warm climates.

Polyethylene was considered to be a good barrier material but it acted as a lubricant when blended with polyurethane. Slip planes existed between the polyethylene and the elastomeric urethane. Apparently there was insufficient cross-linking between the crystalline and elastomeric components. The result, again, was uncontrolled and excessive elongation due to tensile relaxation. Later tests indicated that at least 10% cross-linking was necessary to prevent these problems and to provide materials useable in inflated cushions where diffusion pumping is important to maintain pressure. Thus, new materials are now available which may be used in accordance with this invention.

Polyurethane has proved to be an excellent thermoplastic elastomeric film for use in hundreds of millions of inflated products manufactured and sold world-wide by Nike Shoe Company during the last ten years. Therefore, it is an excellent choice for blending or co-polymerizing with a crystalline polymer as PET. The physical properties of this polyurethane are as follows:

| | |
|---|---|
| Durometer | 80A to 100A |
| Tensile Strength, psi | 7000 to 10,000 |

| | |
|---|---|
| Elongation at break | 350 |
| Modulus of Elasticity at 100% elongation (psi) | 2000 to 3000 |
| Tear strength (lbs per inch)[2] | 500 |
| Taber abrasion[1] | 4 |
| Dielectric heat seal | Excellent |
| Flexural fatigue resistance | Excellent |

[1] Taber ASTM D-1044 CS17 Wheel, 1000 grams load, 5000 cycles.
[2] ASTM D-1044

Polyurethane is a thermoplastic elastomer with alternating block copolymers having segments (20%) of a hard, highly polar or crystalline material linked by segments (80%) of amorphous elastomeric materials (polyesters or polyethers) which are rubber-like at normal service temperatures. The hard and soft segments alternate along the polymer chain. The hard blocks typically consist of a mixture of 2, 4- and 2, 6-toluene diisocyanate, chain-extended with butane diol. When heated, the hard segments melt and the material becomes fluid. When cooled, the segments reharden and link the soft segments to give a solid-state structure similar to thermoplastic rubber. Because these polymers do not retain phase separation or structure in the melt, they are easily processed. Because the soft elastomer segments are polar, they are quite readily heat-sealable, especially with R-F dielectric heat-sealing. Their superior flexural fatigue properties have been demonstrated in tens of thousands of severe tests with laboratory endurance fatigue machines as well as in tens of millions of pairs of athletic and leisure shoes.

In order to retain the above stated essential mechanical properties and manufacturing advantages, while reducing the permeability of the film to supergas and nitrogen, it is necessary to blend the polymers with other polar polymers. Of particular interest are blends with polyethylene terephthalate (PET) polyester. It is a condensation polymer made by reacting dimethyl terephthalate with ethylene glycol. Biaxially oriented PET film finds wide application. Owing to extremely low moisture absorption of PET, mechanical properties are virtually unaffected by humidity. Greater impact resistance is available with new toughened grades of PET. These materials are based on PET/elastomer alloys. Reinforced PET polymers are also available and useful.

Another thermoplastic elastomer parent material that can be blended or copolymerized with crystalline elements is "HYTREL" (trade name of the Du Pont Company). Hytrel can also be processed by conventional thermoplastic techniques. Several formulations possess the requisite physical properties of melt-point, tensile strength, elongation, flexural modulus, fatigue resistance and tear strength. Hytrel has 40 to 80 percent hard segments and 60 to 20 percent soft segments. Although hydrolytic instability can be a problem it can be reduced to acceptable levels through the addition of Stiboxol. The harder Hytrel formulations have excellent low gas diffusion rates but are too stiff for air-cushion applications. The softer formulations (40D shore durometer, Hytrel 4056 for example) have good flexural properties but lack low-permeability properties. Using the approaches outlined in this application, this can be rectified by blending or copolymerizing with crystalline polymers.

Still another good thermoplastic parent material is "RITEFLEX" (trade name of the Cellanese Corp.). Riteflex 540 and Tieflex 547, with durometers of 40D and 47D are typical candidates which can be processed in conventional injection molding and extrusion equipment. The materials are 30 to 40 percent crystalline. Melt temperatures are somewhat lower than the Hytrels, and are in the 380–420 degrees F. range.

It should be understood that this invention is not limited to the thermoplastic elastomer formulations discussed in this application as parent envelope materials, but includes such materials in the general sense. The thermoplastic materials can be either thermoplastic or thermoset. The same generalization applies to the more highly crystalline elements which are blended or copolymerized with the parent polymer to achieve desired control of rates of diffusion pumping and permeability.

Figure 17:
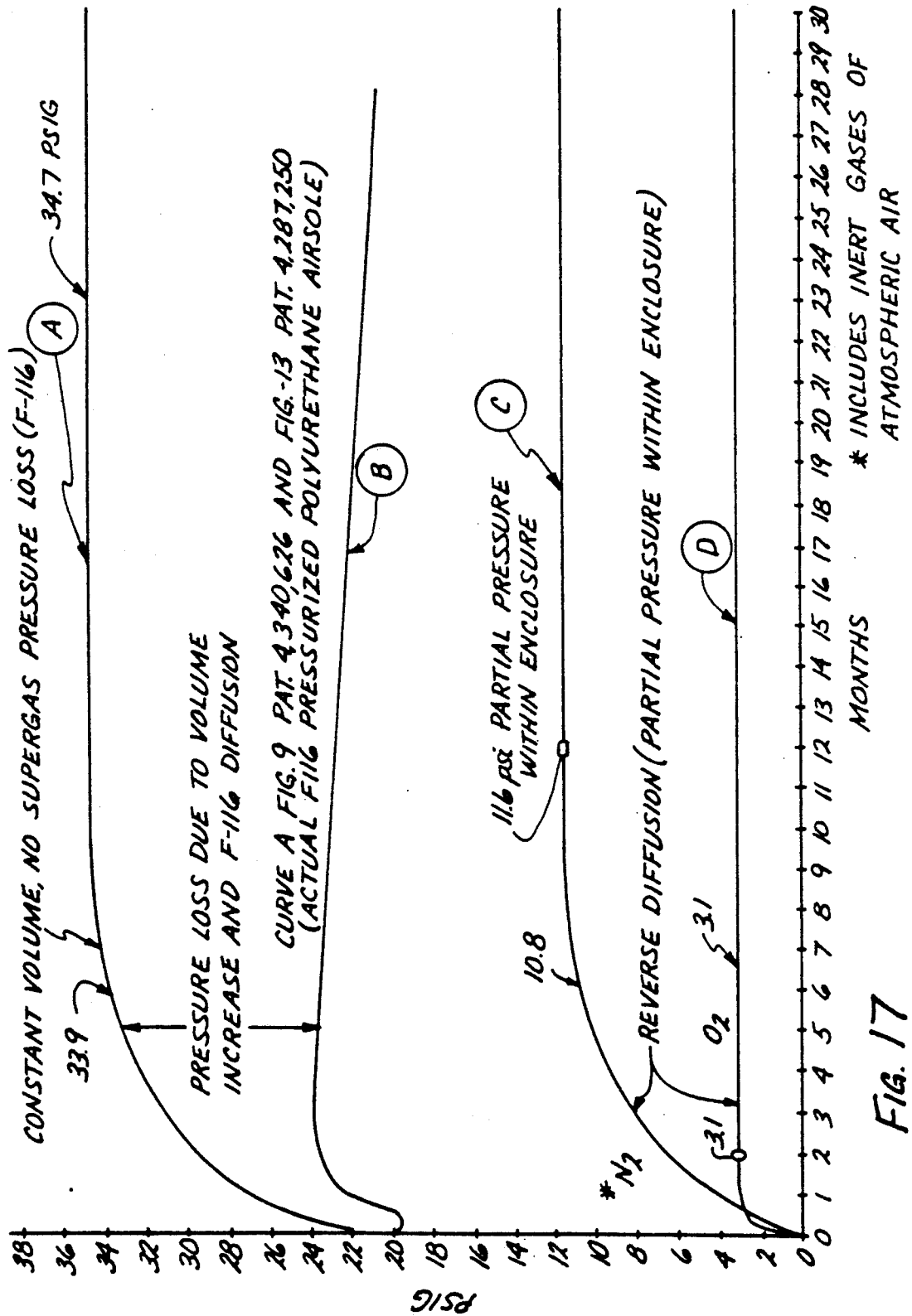
FIG. 17 is a graph illustrating the pressure trend over time in the case of the prior diffusion pumping technique.
Figure 18:
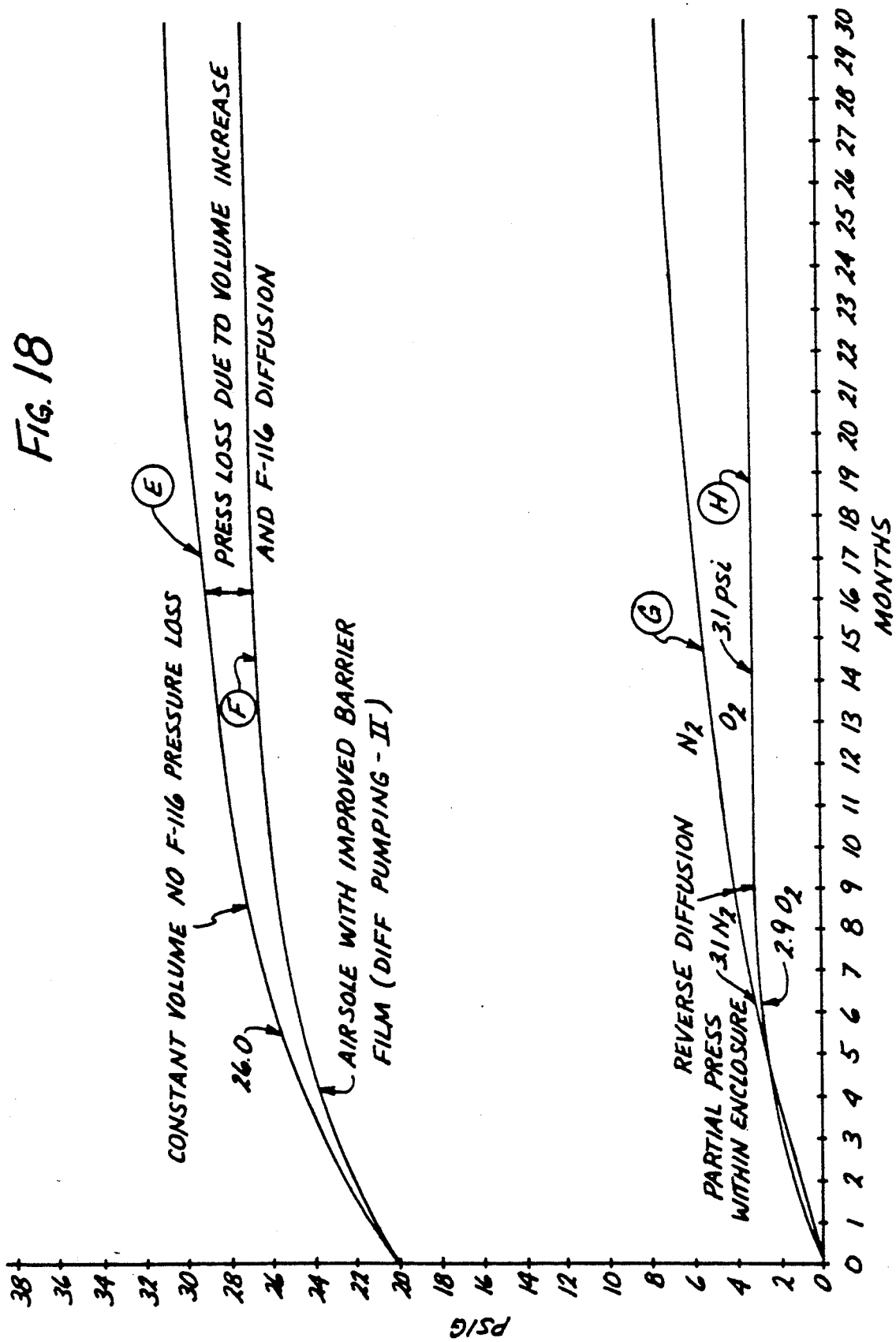
FIG. 18 is a graph illustrating the pressure trend over time in the case of diffusion pumping in accordance with this invention.
Figure 19:
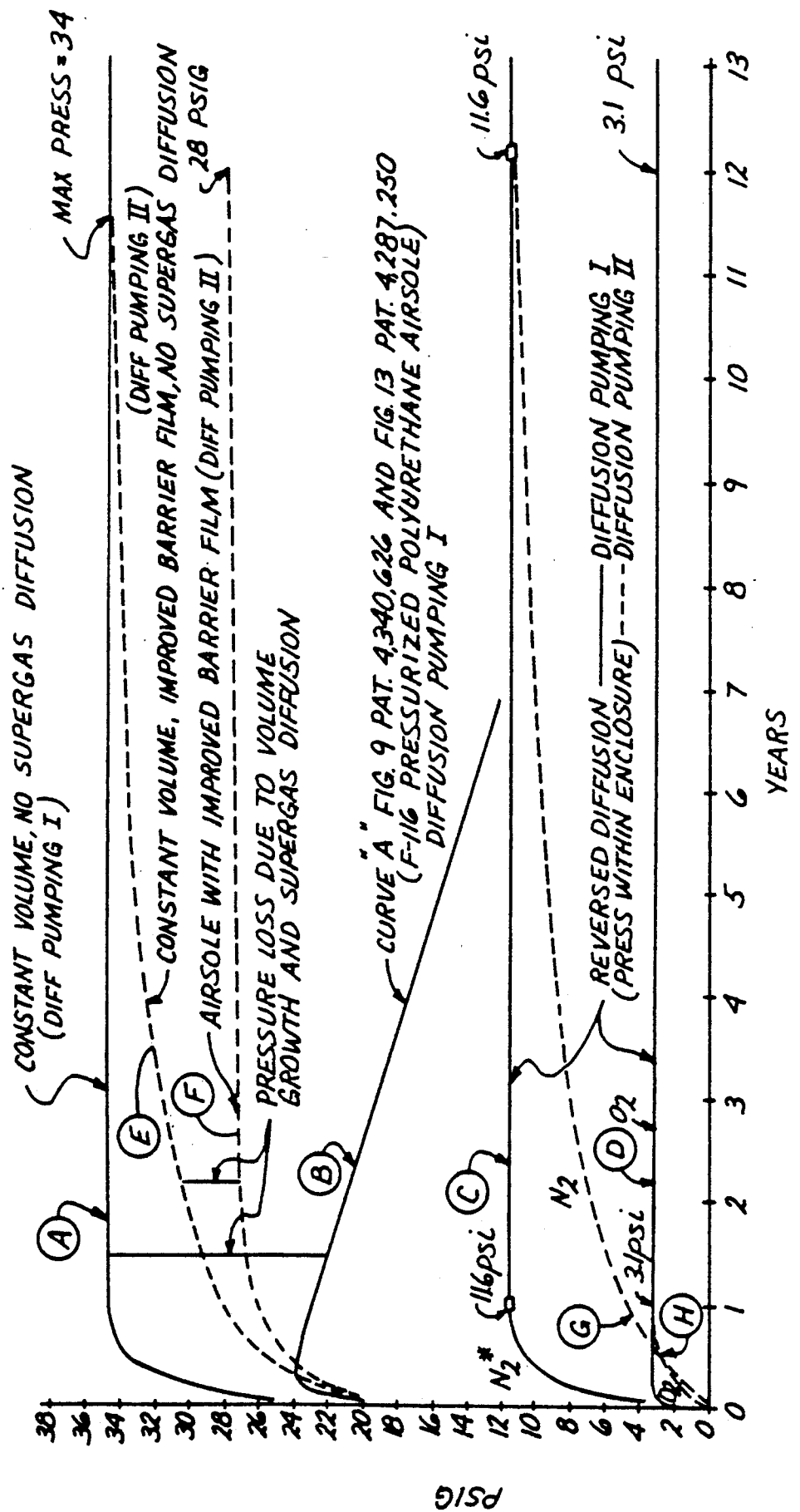
FIG. 19 is a graph in which the graphs of FIGS. 17 and 18 have been superimposed for comparison.

To understand better the differences between the present invention and the prior diffusion pumping technique and the advantages of the present invention, reference is made to FIGS. 17–19. Curve A of FIG. 17 illustrates the pressure trend with time that would take place in an idealized limiting case, i.e., a sealed envelope which has a constant volume (the envelope material does not stretch) and which is inflated at 20 psi with a supergas (Freon 116) which has a constant partial pressure within the envelope. As seen, the internal pressure continues to rise until stabilized at a pressure level of 34.7 psig. This pressure rise is due to the diffusion pumping of nitrogen gas, curve C of FIG. 17 and of oxygen gas, curve D of that figure, from ambient environmental air. Curve A is the sum of curves C and D added to the initial 20 psi inflation as represented by curve A. For example, after 6 months, enough nitrogen gas will have diffused into the envelope to create a partial pressure of nitrogen gas of 10.8 psi. Likewise, the partial pressure of oxygen gas will be 3.1 psi. The sum of these two pressures added to the initial pressurization gives the 33.9 psig value of curve A after 6 months.

Curve A of FIG. 17 is, however, an idealized case which provides a convenient manner of describing the prior diffusion pumping technique when related to curves C and D. An actual case of diffusion pumping of an inflated load carrying device is illustrated in curve B of FIG. 17. The latter curve is identical to curve A of FIG. 9 of the U.S. Pat. No. '626 and FIG. 13 of the U.S. Pat. No. '250 which is the case of an actual AIR SOLE using polyurethane film and pressurized with F 116 supergas. In comparing the idealized curve A with the actual device, curve B, it is seen that the pressure in curve B is considerably lower than the idealized case. The pressure difference is due to tensile relaxation of the film, or stretching thereof, and the outward diffusion loss of some of the supergas. As seen, curve B rises quite quickly as the oxygen and nitrogen gas are diffusion pumped inwardly during the first 4 to 6 months of inflation.

FIG. 18 presents data, again as pressure trend versus time for products in accordance with this invention. Curves E, F, G, and H correspond respectively to curves A, B, C, and D of FIG. 17. Curve E is an idealized case in accordance with this invention (constant volume and constant supergas internal partial pressure). Curve G is nitrogen gas partial pressure which has diffusion pumped into the device while curve H is the oxygen gas partial pressure which has been diffusion pumped into the device. In comparing curves G and H with curves C and D, it is seen that with the improved barrier film in accordance with this invention, inward diffusion of oxygen and nitrogen gas occurs more slowly. For example, after 6 months the partial pressure of nitrogen gas is only 3.1 psi while that of oxygen is 2.9 psi. Oxygen diffusion pumps more rapidly than nitrogen. These partial pressures when added to the 20 psi initial inflation pressure give the total pressure of 26 psi of curve E.

Again, it is seen that curve F which is the actual data for a load carrying device of the present invention is lower in pressure than the idealized curve E. However, the difference between the actual and idealized curves in accordance with this invention is less than data of FIG. 17. This is because the improved barrier film material of this invention reduces further the normally slow outward diffusion of supergas and the improved film material of this invention has reduced tensile relaxation. The result is that the inflated volume of products in accordance with this invention remains relatively constant over time. The differences between curves E and F is primarily due to tensile relaxation of the film because loss of supergas pressure is very slight over the long term.

FIG. 19 superimposes the data from FIGS. 17 and 18 and expands the scale from 2½ years to 14 years to illustrate the improved pressure maintenance in accordance with this invention. In comparing curve B and F, it is seen that the pressure of curve B starts to fall rather drastically after the first 4 months, during which time the pressure had actually risen quite rapidly due to the rapid diffusion pumping of oxygen and nitrogen gases (curves C and D) into the enclosure. As time passes, the pressure continues to fall, so that after 2½ years, the pressure has decreased back to the 20 psi initial inflation pressure. After 4 years, the pressure has dropped to 17 psig and continues to fall.

By contrast, curve F, representing the present invention, never experiences a drop in pressure, but in fact exhibits a continued gradual rise in pressure until the pressure levels out to a steady state constant value of 28 psig after about 7 years. Data from curves B and F for the actual two load carrying devices can be tabulated to show more effectively the advantages of the present invention, as follows:

| Time | Curve B (psi) | Curve F (psi) | Percent Improvement |
|---|---|---|---|
| 1 year | 22.8 | 26.2 | 15% |
| 2 years | 21.0 | 27.1 | 29% |
| 3 years | 18.2 | 27.3 | 50% |
| 5 years | 14.5 | 27.5 | 90% |
| 7 years | 12.0 | 27.7 | 130% |

These data indicate the improvement in long term pressurization that can be obtained in accordance with this invention. Long term tests confirm the new and unique long term results using F 116, air and nitrogen gas, as shown in the graphs. Acceptable pressurization therefore can be achieved with lesser, less expensive supergases, or in the limiting case, inflation with air or nitrogen.

Curve F of FIG. 19 represents the case of the improved barrier material of this invention where oxygen gas is the mobile gas, reaching a full partial pressure of 3.1 psi in one year, and nitrogen is the semi-mobile gas, reaching a full 11.6 psi partial pressure in 12 years. As indicated from curve F, it is possible to obtain very long term permanent inflation within an envelope in accordance with this invention. However, one possible disadvantage is that the pressure rises to 27 psi after a couple of years, which is 7 psi higher (about ⅓ higher) than the initial inflation pressure. This can be mitigated by initial inflation with a mixture of air and supergas, or by inflating with one of the lesser supergases, i.e., one that diffuses more rapidly.

A better and preferred solution in accordance with this invention, is initially to inflate with 100% nitrogen gas. Curve K of FIG. 20 represents the pressure-time relationship for a product in accordance with this invention initially pressurized with 100% nitrogen gas. Curve I shows the reverse diffusion of the partial pressure of the mobile oxygen gas into the enclosure while curve J is the partial pressure of nitrogen gas within the enclosure. Curve K is the sum of curves I and J. As is seen, the pressure "overshot" of curve K is only 10% of the initial inflation pressure, which is quite acceptable. Also, the initial pressure does not start dropping below the 20 psi initial inflation pressure until about 5½ years have elapsed. This is considered excellent long-term permanent inflation and is achieved by inflating with an available, inexpensive and harmless gas, nitrogen gas.

FIG. 21 is a composite of the three types of diffusion pumping already described in the prior graphs. Curve B is the prior diffusion pumping with a supergas. Curve F is diffusion pumping in accordance with this invention, using supergas and mobile oxygen and captive nitrogen gases. Curve K is the same as curve F, but initial inflation is at 20 psig using pure nitrogen gas in place of supergas.

Figure 24:
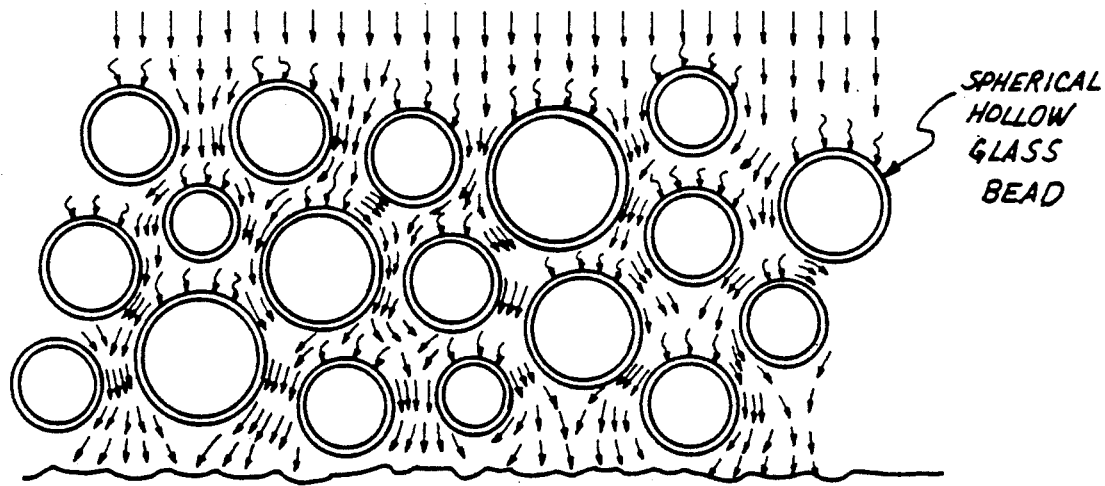
FIG. 24 is an enlarged diagrammatic sectional view of an improved barrier film in accordance with this invention containing small and thin walled hollow spheres within the elastomeric film.

FIGS. 22 through 24 illustrate various structures in accordance with this invention in order to understand better the diffusion phenomena described. In FIG. 22, the crystalline elements are shown enlarged about 1000 times and are securely bonded to the elastomeric material of the improve barrier layer. In the form illustrated, the crystalline material may be crystalline mesh or fibrous fabric material bonded securely to the elastomeric material as by adhesive, mechanical or molecular attachment. The small arrows illustrate the flow (activated diffusion) of the inflatant medium or reverse diffusion of ambient air through the barrier material. In activated diffusion, the inflatant gases first condense on the outer surfaces of the barrier film, then migrate through the film in the liquid state, to emerge on the opposite side of the film and then re-evaporate as a gas. As indicated in FIG. 22, the crystalline elements effectively form a blockage or flow restriction to the movement of the inflatant medium through the barrier envelope and the inward reverse diffusion of air. This is illustrated diagrammatically by the bent arrows impinging on the surfaces of the crystalline material, thereby deflecting the flow around the crystalline elements, and subsequently crowding or squeezing the flow within the narrow passages between adjacent portions of the crystalline elements, as the inflatant medium continues to move through the elastomeric material encompassing the crystalline material.

In the form illustrated in FIG. 22, a large portion of the barrier film cross-section is occupied by the crystalline material, which permits essentially zero flow of inflatant medium. This, combined with the fact that the elastomeric material basically is a reasonably good barrier to supergas diffusion, results in a very effective mechanism for control of diffusion pumping, so as to achieve much more precise and stable inflation pressures, over a substantially greater time period thereby providing a much improved and superior product.

The form illustrated in FIG. 23 is similar to that of FIG. 22 except that the crystalline elements are merely imbedded in the elastomeric material, rather than being securely attached thereto, as in FIG. 22, through the use of appropriate bonding or coupling procedures including temperature, pressure and time which is needed to achieve a good mechanical or chemical bond. If a good bond is not achieved, as illustrated in FIG. 23, voids exist around the crystalline elements or structure. These voids are illustrated in FIG. 23 as concentric rings or spaces around the idealized crystalline elements illustrated for purposes of explanation. The arrows, which indicate the movement of the inflatant medium, are shown to move into the voids and selectively transport very easily and quickly through the path of least resistance created by the voids. The longer length of the arrows, as compared to FIG. 22, are meant to indicate comparative ease of transport of the inflatant medium with reduced crowding and constricting flow at the narrow passages between adjacent portions of the crystalline material. Thus, it is important in producing an effective composite structure for control of diffusion pumping to achieve a good bond between the elastomer material and the crystalline material or elements. This is also important in achieving acceptable, long term flexural fatigue strength and life.

The form illustrated in FIG. 24 includes crystalline elements in the form of thin walled, hollow glass spherical micro-beads with random diameters ranging from 50 to 200 microns or more. Beads with such various diameters are more cost effective than those with uniform diameters, although the latter may be used. As in FIGS. 22 and 23, the transport of inflatant medium through the composite improved barrier material is shown by arrows. The enlargement of this view is about 100,000 times. The blunted and distorted arrows indicate the flow impinging on the surface of the beads and thus being deflected around the beads into the flow restricting passages between adjacent beads. It is understood that the crystalline beads can also be of a larger size, solid rather than hollow, and made from crystalline material other than glass.

Figure 25:
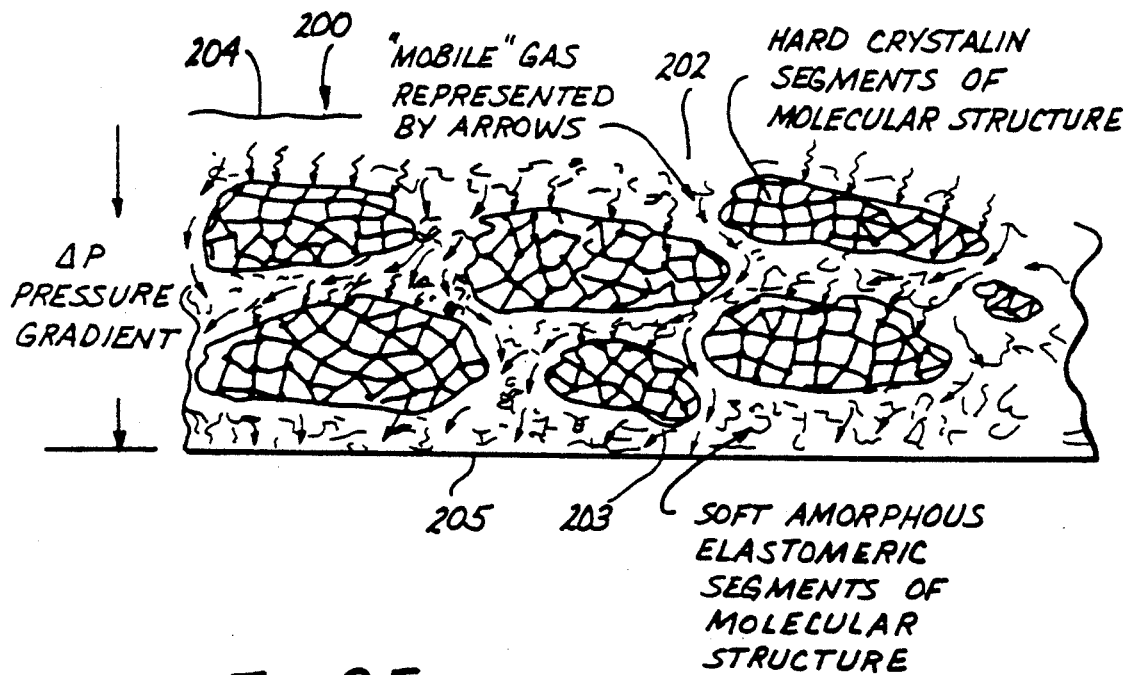
FIG. 25 is an enlarged diagrammatic sectional view of an improved pressurized device in accordance with this invention in which the barrier film material is formed of a composite crystallographic-amorphous-elastomeric barrier material.

Referring to FIG. 25, the latter illustrates one form of the invention in which an improved barrier film 200 is used to form the envelope to be pressurized. In this form, the barrier film is in the form of a composite crystallographic-amorphous-elastomeric barrier material in which the host material 202 is an amorphous elastomeric material whose crystallinity increased by the presence of hard crystalline segments or elements 203 which may be highly distorted, elongated or flattened out. These hard crystalline segments or elements are preferably uniformly distributed throughout the host material. This may be achieved by appropriate cross-linking and grafting or other polymerization techniques. The distortion may be achieved by stretching or compressing the material while the crystals are in formation. The distortion effectively stresses the crystal structure of the elements 203 in the host material with the result that there is an increase in the cohesive energy density and the crystalline elements are far more effective as crystalline diffusion barrier elements than those which have not been distorted. Side 204 is the interior wall of the envelope and side 205 is the exterior side or ambient air side of the envelope.

In this form, the barrier material is permeable to mobile gases, semi-permeable to select captive gases and essentially impermeable to supergases. The scale illustrated is that which would be seen under an electron microscope. Again, the arrows indicate the flow of the mobile gas through the barrier film. In this form the host material comprised of soft elastomeric segments or regions while the crystalline segements or regions are of a hard crystalline material.

As should now be apparent to those skilled in the art, the products of this invention may be used in a wide variety of products, although the description has focused on foot wear. For example, the products in accordance with this invention may be used in helmets for athletic, military, construction, industrial, motorcycle, bicycle, or other helmets; in saddles and seat cushions; in gloves or protective gear; in seals for doors, windows, aircraft, space vehicles, industrial and oil field seals; mattresses and pillows; packaging products; flotation devices of various types; handles and handle grips for tennis racquets, jack hammers, power saws; shock mounted or shock producing devices of various types; and any of the various devices or uses which are apparent to those skilled in the art who are familiar with energy absorbing and energy return devices and cushioning and resilient devices, as will be apparent from the above detailed disclosure.

What is claimed is:

1. A load carrying gas pressurized cushioning device comprising:
   a sealed envelope having at least one chamber formed by at least spaced wall portions of a film like material;
   said film like material being plastic and polar and elastomeric and having gas diffusion properties of a partially crystalline film material;
   said envelope being initially pressurized to a predetermined pressure by at least a captive gas with respect to which said film like material acts as a barrier to retard diffusion of the captive gas therethrough;
   said film material being characterized by the ability to retain said captive gas to maintain said device at least partially pressurized and to permit diffusion therethrough of a mobile gas; and
   the internal pressure of said envelope being the sum of the partial pressures of the mobile and captive gases.

2. A load carrying pressurized cushioning device as set forth in claim 1 wherein said captive gas is nitrogen gas.

3. A load carrying pressurized cushioning device as set forth in claim 1 wherein said captive gas includes at least one supergas.

4. A load carrying pressurized cushioning device as set forth in claim 1 wherein said crystalline properties are provided by a crystalline material contained within said film like material.

5. A load carrying pressurized cushioning device as set forth in claim 4 wherein said crystalline material is a highly crystalline scrim.

6. A load carrying pressurized cushioning device as set forth in claim 4 wherein said crystalline material is lock stitched material.

7. A load carrying pressurized cushioning device as set forth in claim 4 wherein said crystalline material is a crystalline polymeric material.

8. A load carrying pressurized cushioning device as set forth in claim 4 wherein said crystalline material is a fibrous material.

9. A load carrying pressurized cushioning device as set forth in claim 4 wherein said crystalline material is a crystalline platelet material.

10. A load carrying pressurized cushioning device as set forth in claim 1 wherein said film like material is an elastomeric polyurethane polymer.

11. A load carrying pressurized cushioning device as set forth in claim 1 wherein the cushioning device is a component of footwear.

12. A load carrying pressurized cushioning device as set forth in claim 8 wherein said cushioning device is a heel ped.

13. A load carrying pressurized cushioning device as set forth in claim 8 wherein said cushioning device is a full length sole component.

14. A load carrying pressurized cushioning device as set forth in claim 8 wherein said cushioning device is of a length less than the length of the footwear.

15. A load carrying pressurized cushioning device as set forth in claim 8 wherein said cushioning device is at least partly foam encapsulated.

16. A load carrying pressurized cushioning device as set forth in claim 1 wherein said sealed envelope is formed of at least two sheets of film material.

17. A load carrying pressurized cushioning device as set forth in claim 1 wherein said crystalline material is a metal or metal alloy in a form selected from the group consisting of filaments, powder, platelets, cloth, beads and micro-spheres.

18. A load carrying pressurized cushioning device as set forth in claim 1 wherein said sealed envelope is composed of a plurality of separately sealed chambers.

19. A load carrying pressurized cushioning device as set forth in claim 1 wherein said sealed envelope is composed of at least two interconnected chambers.

20. A load carrying pressurized cushioning device as set forth in claim 1 wherein the internal pressure of said envelope is above atmospheric pressure.

21. A load carrying pressurized cushioning device as set forth in claim 1 wherein said envelope includes at least one peripheral seam.

22. A load carrying pressurized cushioning device as set forth in claim 1 wherein said crystalline properties are provided by a crystalline material joined to at least one surface of said film material.

23. A load carrying pressurized cushioning device as set forth in claim 21 in which said crystalline material is a thin metal layer.

24. A load carrying pressurized cushioning device as set forth in claim 1 wherein said film like material is a mixture of polymeric materials at least one of which is a crystalline material.

25. A load carrying pressurized cushioning device as set forth in claim 1 wherein said crystalline properties are provided by a polyethyleneterephthalate polymeric material.

26. A load carrying pressurized cushioning device as set forth in claim 1 wherein the film like material is composed at least in part of a thermoplastic elastomer.

27. A load carrying pressurized cushioning device as set forth in claim 1 wherein said film like material is composed at least in part of a thermoplastic polyester elastomer.

28. A load carrying pressurized cushioning device as set forth in claim 1 wherein the captive gas includes air or nitrogen or supergas and the mobile gas includes oxygen.

29. A load carrying pressurized cushioning device as set forth in claim 1 wherein the captive gas is nitrogen and the mobile gas includes oxygen.

30. A method for producing a load carrying gas pressurized and resilient cushioning device comprising the steps of:
   providing an envelope having at least one chamber formed by at least spaced wall portions of a film like material;
   said film like material being plastic and elastomeric and having gas diffusion properties of a partially crystalline material;
   initially pressurizing said envelope to a predetermined pressure by at least a one gas with respect to which said film like material acts as a barrier to retard diffusion of the said one gas therethrough;
   said film material being characterized by the ability to retain said one gas to maintain said device at least partially pressurized and to permit diffusion therethrough of a mobile gas;
   sealing said envelope to contain said one gas; and
   exposing said sealed envelope to ambient air whereby a mobile gas in said ambient air diffuses into said sealed envelope such that the internal pressure of said envelope is the sum of the partial pressures of said one gas and the mobile gas.

31. A method for producing a load carrying gas pressurized and resilient cushioning device as set forth in claim 30 wherein said one gas is nitrogen gas.

32. A method for producing a load carrying gas pressurized and resilient cushioning device as set forth in claim 30 wherein said one gas is a supergas.

33. A method for producing a load carrying gas pressurized and resilient cushioning device as set forth in claim 30 wherein said envelope is provided from flat sheet like material.

34. A method for producing a load carrying gas pressurized and resilient cushioning device as set forth in claim 30 wherein said envelope is formed by any one or a combination of blow-molding, injection molding, slush casting, vacuum forming, roto molding, transfer molding and pressure forming.

35. A method for producing a load carrying gas pressurized and resilient cushioning device as set forth in claim 30 wherein said envelope is formed of a thermoplastic material.

36. A method for producing a load carrying gas pressurized and resilient cushioning device as set forth in claim 30 wherein said envelope is formed of a thermoset material.

37. A method for producing a load carrying gas pressurized and resilient cushioning device as set forth in claim 30 wherein said envelope is formed by welding at least a portion of the walls thereof together, and
   wherein the inner surfaces of the walls are treated with a priming agent prior to said welding.

38. A method for producing a load carrying gas pressurized and resilient cushioning device as set forth in claim 30 wherein said cushioning device is assembled to an article of footwear.

39. A method for producing a load carrying gas pressurized and resilient cushioning device as set forth in claim 30 wherein said one gas is a captive gas which includes air or nitrogen or supergas or mixtures thereof and wherein said mobile gas is oxygen.

40. A method for producing a load carrying gas pressurized and resilient cushioning device as set forth in claim 30 wherein the step of initially pressurizing includes pressurizing to an internal pressure above atmospheric pressure.

41. A method for producing a load carrying gas pressurized and resilient cushioning device as set forth in claim 30 wherein said gas diffusion properties of a partly crystalline material are provided by a crystalline material contained within said film like material.

42. A method for producing a load carrying gas pressurized and resilient cushioning device as set forth in claim 41 wherein said crystalline material is a fibrous material.

43. A method for producing a load carrying gas pressurized and resilient cushioning device as set forth in claim 42 wherein said fibrous material is a locked stitch material.

44. A method for producing a load carrying gas pressurized and resilient cushioning device as set forth in claim 41 wherein said crystallin material is a crystalline platelet material.

45. A method for producing a load carrying gas pressurized and resilient cushioning device as set forth in claim 41 wherein said crystalline material is a highly crystalline scrim.

46. A method for producing a load carrying gas pressurized and resilient cushioning device as set forth in claim 41 wherein said crystalline material is a metal or metal alloy in a form selected from the group consisting of filaments, powder, platelets, cloth, beads and microspheres.

47. A method for producing a load carrying gas pressurized and resilient cushioning device as set forth in claim 30 wherein said step of providing an envelope includes formation of a plurality of separate chambers in said envelope; and pressurizing each of said chambers and therafter sealing the same.

48. A method for producing a load carrying gas pressurized and resilient cushioning device as set forth in claim 30 wherein said crystalline properties are provided by a crystalline material joined to at least one surface of the film material.

49. A method for producing a load carrying gas pressurized and resilient cushioning device as set forth in claim 48 in which said crystalline material is a thin metal layer.

50. A method for producing a load carrying gas pressurized and resilient cushioning device as set forth in claim 48 wherein said crystalline material is a crystalline polymeric material.

51. A method for producing a load carrying gas pressurized and resilient cushioning device as set forth in claim 30 wherein said film like material is a mixture of polymeric materials at least one of which is a crystalline material.

52. A method for producing a load carrying gas pressurized and resilient cushioning device as set forth in claim 30 wherein said crystalline properties are provided by a polyethyleneterephthalate polymeric material.

53. A method for producing a load carrying gas pressurized and resilient cushioning device as set forth in claim 30 wherein said film like material is a polyurethane material.

54. A load carrying gas pressurized cushioning device comprising:
a sealed envelope having at least one chamber formed by at least spaced wall portions of a film like material;
said film like material being a composite crystallographic-amorphous-elastomeric barrier material;
said envelope being initially pressurized to a predetermined pressure by at least one gas with respect to which said film like material acts as a barrier to retard diffusion of a captive gas therethrough;
said film material being characterized by having hard crystalline segments or elements within said elastomeric material so as to enhance the activated diffusion barrier characteristics of said barrier material by the ability to retain said at least one gas and to maintain said device at least partially pressurized and to permit diffusion therethrough of a mobile gas; and
the internal pressure of said envelope being the sum of the partial pressures of said at least one and said captive gases.

55. A load carrying gas pressurized cushioning device as set forth in claim 54 wherein said hard crystalline segments or elements are distorted so as to enhance the activated diffusion barrier characteristics of said barrier material.

* * * * *